(12) United States Patent
Boesch et al.

(10) Patent No.: US 12,542,021 B2
(45) Date of Patent: Feb. 3, 2026

(54) BLOCKCHAIN SUPPORTED BANKNOTE

(71) Applicant: Bundesdruckerei GmbH, Berlin (DE)

(72) Inventors: Christoph Boesch, Nuthetal (DE);
Florian Peters, Berlin (DE); Joerg Rueckriemen, Berlin (DE); Piotr Szegvari, Potsdam (DE)

(73) Assignee: Bundesdruckerei GmbH, Berlin (DE)

( * ) Notice: Subject to any disclaimer, the term of this patent is extended or adjusted under 35 U.S.C. 154(b) by 446 days.

(21) Appl. No.: 18/000,580

(22) PCT Filed: Jun. 4, 2021

(86) PCT No.: PCT/EP2021/065025
§ 371 (c)(1),
(2) Date: Dec. 2, 2022

(87) PCT Pub. No.: WO2021/245244
PCT Pub. Date: Dec. 9, 2021

(65) Prior Publication Data
US 2023/0214830 A1 Jul. 6, 2023

(30) Foreign Application Priority Data
Jun. 5, 2020 (DE) .................. 10 2020 115 035.0

(51) Int. Cl.
*G07D 7/004* (2016.01)
*G06Q 20/38* (2012.01)
(Continued)

(52) U.S. Cl.
CPC ......... *G07D 7/004* (2013.01); *G06Q 20/3825* (2013.01); *G06Q 20/3829* (2013.01);
(Continued)

(58) Field of Classification Search
CPC .......... G06Q 20/3825; G06Q 20/3829; G06Q 20/389; G07D 7/004; G07D 7/01;
(Continued)

(56) References Cited

U.S. PATENT DOCUMENTS 11,080,694 B2 * 8/2021 Ma .................. G06Q 20/389
11,308,487 B1 * 4/2022 Foster ............... G06Q 20/3829
(Continued)

FOREIGN PATENT DOCUMENTS

KR 2008-0105683 A 12/2008
WO WO-2017/028828 A1 2/2017

OTHER PUBLICATIONS

International Preliminary Report on Patentability dated Dec. 15, 2022 for corresponding International Application No. PCT/EP2021/065025.

(Continued)

*Primary Examiner* — John W Hayes
*Assistant Examiner* — Wodajo Getachew
(74) *Attorney, Agent, or Firm* — Harness, Dickey & Pierce, P.L.C.

(57) ABSTRACT

A banknote includes a security element with a processor and a memory. A private cryptographic key of an asymmetric key pair of the banknote is stored in a protected memory area of the memory. The asymmetric key pair is assigned to a banknote-specific blockchain address in a blockchain. A payment method executed with the banknote includes receiving a payment request for a payment with the banknote in the form of a transaction of an amount to be paid from the blockchain address of the banknote to a blockchain address of a payee, signing a transaction approval with the private cryptographic key of the banknote, and sending the signed transaction approval.

18 Claims, 14 Drawing Sheets

Figure 1A:
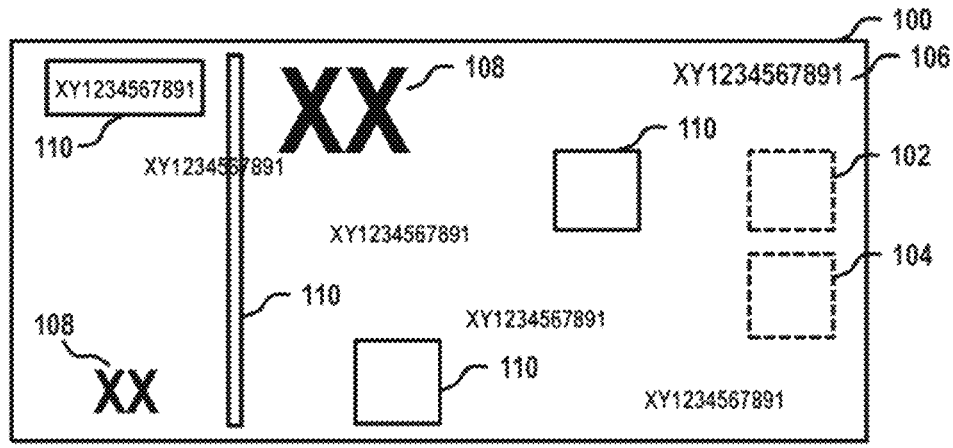

(51) Int. Cl.
  *H04L 9/00* (2022.01)
  *H04L 9/08* (2006.01)
  *H04L 9/32* (2006.01)
  *H04W 12/069* (2021.01)
  *H04W 12/12* (2021.01)

(52) U.S. Cl.
  CPC .......... *H04L 9/0825* (2013.01); *H04L 9/3247* (2013.01); *H04L 9/50* (2022.05); *H04W 12/069* (2021.01); *H04W 12/12* (2013.01)

(58) Field of Classification Search
  CPC . G07D 2207/00; H04L 9/0825; H04L 9/0877; H04L 9/3247; H04L 9/50; H04N 21/4185
  USPC .......................................................... 705/71
  See application file for complete search history.

(56) References Cited

U.S. PATENT DOCUMENTS

| | | | | |
|---|---|---|---|---|
| 2013/0166455 | A1* | 6/2013 | Feigelson | H04L 9/3234 705/64 |
| 2016/0283941 | A1* | 9/2016 | Andrade | G06Q 20/3829 |
| 2017/0132621 | A1* | 5/2017 | Miller | H04L 9/0861 |
| 2017/0228731 | A1* | 8/2017 | Sheng | G06Q 20/36 |
| 2018/0097635 | A1* | 4/2018 | Moses | H04L 9/30 |
| 2018/0240086 | A1* | 8/2018 | Sobotka | H04L 9/0819 |
| 2018/0331832 | A1* | 11/2018 | Pulsifer | H04L 9/3247 |
| 2020/0119906 | A1* | 4/2020 | Das | H04L 9/50 |
| 2021/0090072 | A1* | 3/2021 | Sewell | H04L 9/0618 |
| 2021/0105142 | A1* | 4/2021 | Lee | G06F 21/31 |
| 2022/0138737 | A1* | 5/2022 | Wright | G06Q 20/0658 705/64 |

OTHER PUBLICATIONS

S. Nakamoto, 'Bitcoin: A Peer-to-Peer Electronic Cash System' Oct. 2008, pp. 1-9, retrieved from the internet Jul. 4, 2017 https://nakamotoinstitute.org/static/docs/bitcoin.pdf.

D. Schwartz, 'The Ripple Protocol Consensus Algorithm' Ripple Labs Inc, Jan. 2014, retrieved on the internet Apr. 19, 2018 https://ripple.com/files/ripple_ consensus_ whitepaper.pdf.

Blockchain, *Wikipedia*, 2020, retrieved on the internet Mar. 27, 2020 https://en.wikipedia.org/wiki/Blockchain.

A. M. Antonopoulos, Mastering Bitcoin—Chapter 7—The Blockchain O'Reilly Media, Inc., Dec. 2014.

International Search Report and Written Opinion thereof dated Nov. 25, 2021 for corresponding International Application No. PCT/EP2021/065025.

Eldefrawy Mohamed Hamdy et al.: "Banknote Validation through an Embedded RFID Chip and an NFC-Enabled Smartphone", Mathematical Problems in Engineering, Bd. 2015,, Jan. 1, 2015, XP055861880, DOI: 10.1155/2015/264514.

Juels A Pappu R: "Squealing Euros: Privacy Protection in FRID-Enabled Banknotes", Electronic Publishing, Artistic Imaging, and Digital Typography; [Lecture Notes in Computer Science, ISSN 0302-9743], Springer Verlag, DE, Bd. 2742, Jan. 1, 2003, XP002338983.

Ching-Nung Yang et al: "Enhancing Privacy and Security in RFID-Enabled Banknotes", Parallel and Distributed Processing With Applications, 2009 IEEE Internationl Symposium On, IEEE, Aug. 10, 2009, XP031515345.

ARIPO Examination Report dated Sep. 26, 2023 for corresponding ARIPO Application No. AP/P/2022/014537.

European Office Action issued Mar. 26, 2025 in European Patent Application No. 21 751 498.3.

"Reference Architecture and Use Cases Report; DFC-O-014", ITU-T Draft; Study Period 2017-2020; Focus Group DFC; Series DFC-O-014, International Telecommunication Union, Geneva; Aug. 16, 2019 (Aug. 16, 2019), pp. 1-61, XP044273337.

Noll, Franklin, "Smart Banknotes Defined: Features and Criteria", Oct. 7, 2020 (Oct. 7, 2020), pp. 1-4, XP093261689.

European Office Action issued Aug. 7, 2025 in European Patent Applicaiton No. 21751498.3.

Julin, Eva, "The Riksbank's e-krona project", Oct. 1, 2018, 52 pages, XP093301412, URL:https://www.riksbank.se/globalassets/media/rapporter/e-krona/2018/the-riksbanks-e-krona-project-report-2.pdf.

* cited by examiner

BLOCKCHAIN SUPPORTED BANKNOTE

CROSS-REFERENCE TO RELATED APPLICATIONS

This application is a national phase under 35 U.S.C. § 371 of PCT International Application No. PCT/EP2021/065025 which has an International filing date of Jun. 4, 2021, which claims priority to German Application No. 10 2020 115 035.0, filed Jun. 5, 2020, the entire contents of each of which are hereby incorporated by reference.

The invention relates to a banknote and a method for issuing, using, and replacing banknotes. The invention further relates to a method for processing payments using a terminal.

In the context of increasing digitalization, more and more cashless payment instruments are currently moving into the foreground, in particular those based on electronic methods for processing payments. In cashless payment transactions, a transfer of the means of payment is carried out without cash being transferred. In the case of cash payments, cash, i.e., banknotes or coins, are exchanged between the payer and the payee, whereas in the case of a cashless payment, there is no such exchange of cash.

Cash has the advantage, for example, in that it is available to everyone and may be used quickly and everywhere. Thus, for example, no bank account is required for cash-based payment processing. In addition, cash is often valued by its owners as store of value.

In contrast, cashless payment methods have the advantage, for example, that they enable an efficient payment process, even if the payer and payee are located in distant locations, as is the case, for example, when shopping via the internet. Known banknotes are unable to do this.

Therefore, the underlying object of the invention is to create an improved banknote.

The problem underlying the invention is respectively solved with the features of the independent patent claims. Embodiments of the invention are specified in the dependent patent claims.

Embodiments comprise a banknote. The banknote comprises a security element with a processor and a memory with program instructions. A banknote-specific private cryptographic key of an asymmetric key pair of the banknote is stored in a protected memory area of the memory. The asymmetric key pair is assigned to a banknote-specific blockchain address in a blockchain managed by a central bank issuing the banknote.

The processor is thereby configured to execute a payment method with the banknote when executing the program instructions. The payment method comprises:

Receiving a payment request for a payment with the banknote in the form of a transaction of an amount to be paid from the blockchain address of the banknote to a blockchain address of a payee, wherein the payment request specifies the amount to be paid and the blockchain address of the payee.
  Signing a transaction approval with the private cryptographic key of the banknote, wherein the transaction approval comprises the blockchain address of the banknote, the blockchain address of the payee, and the amount to be paid,
  Sending the signed transaction approval.

According to embodiments, an additional transaction-specific value is further sent together with the signed transaction approval. For example, the additional transaction-specific value is included with the signature of the transaction approval and/or is appended to the signed transaction approval. The additional transaction-specific value is, for example, a timestamp and/or a random number.

According to embodiments, the banknote comprises, for example, a visual indication of a serial number uniquely identifying the banknote. According to embodiments, the banknote comprises, for example, a visual indication of an initial nominal value assigned to the banknote.

According to embodiments, the banknote comprises, for example, a communication interface, via which it may, for example, receive the payment request and/or send the payment authorization. For example, the communication interface is configured to communicate with a terminal for the purposes of receiving the payment request and/or sending the payment authorization. The payment request received via the communication interface is forwarded, for example, to the processor. The payment authorization is sent from the processor for further sending to the communication interface. According to embodiments, the banknote comprises, for example, an input device for receiving the payment request and/or an output device for outputting the payment authorization, which is sent from the processor to the output device for the purpose of outputting. The payment request received via the input device is forwarded, for example, to the processor.

Embodiments may have the advantage that the banknote may be used, not only in the usual sense as a cash payment means, but a cashless payment may additionally also be performed with the banknote. When used as a cash payment means in the usual sense, the banknote is transferred in the context of the payment process from the payer to the payee, or the payee transfers the corresponding banknote to the payer as change in the context of the payment process. With the transfer of the banknote, the ownership of the banknote transfers from the transferor to the recipient. With the ownership of the banknote, ownership of the current nominal value of the banknote, i.e., the nominal value assigned to the blockchain address of the banknote, transfers to the recipient.

When used for a cashless payment, i.e., without transferring the banknote or transferring the ownership of the banknote, a payment is carried out by the banknote by providing a signed transaction approval, i.e., a transaction authorization. This transaction authorization, i.e., signed transaction approval, of the banknote authorizes a transaction, in which the amount to be paid is transferred from the blockchain address of the banknote to the blockchain address of the payee.

For example, a successful authentication of a terminal with respect to the banknote or a successful authenticating of the terminal, from which, for example, the payment request is received, may be a prerequisite by the banknote for signing the transaction authorization or transaction approval and/or for sending the signed transaction authorization or transaction approval. A corresponding authentication or authenticating may, for example, be carried out using cryptographic keys and/or digital certificates. For example, a signature, generated by the terminal using a private cryptographic key as the signature key, is verified using a public cryptographic key provided by a certificate of the terminal as a signature verification key.

For example, the amount of money in circulation and which may be transferred both as cash-based and as cashless is defined by the amount of money or the sum of the nominal values which are assigned to blockchain addresses of banknotes in the blockchain managed by the central bank. For example, the amount of money in circulation remains the same if the banknotes in circulation are retained. This means, for example, that banknotes in circulation may remain the same; however, the nominal values assigned to individual banknotes may change as a consequence of transactions. For example, it would also be possible to change the amount of money assigned to the banknotes without changing the banknotes in circulation, if the central bank would permit payment transfers from the blockchain into other systems, for example, the GIRO SEPA system. To transfer money out of the blockchain, specific blockchain addresses might be provided, for example, to which payments may only be sent and from which it is not possible to send payments. For example, these might be blockchain addresses generated by the central bank, which are assigned, for example, to the central bank. The corresponding blockchain addresses might also be assigned to other legal or natural persons. For example, the central bank generates the corresponding blockchain addresses; however, destroys or deletes the associated private cryptographic keys, whose signatures are necessary for transactions from the corresponding blockchain addresses. For example, an account in another system is assigned to one of these blockchain addresses. If money is transferred to the corresponding blockchain address, the central bank transfers, for example, an identical amount to the associated account of the other system.

Money may be added to the blockchain, for example, by initializing additional banknotes or blockchain addresses assigned to the additional banknotes by the central bank. Furthermore, the central bank might, for example, draw on one or more of its assigned blockchain addresses, which are not subject to limitations with respect to the transferable amounts of money, to send payments to other blockchain addresses. For example, the central bank sends money to a blockchain address, in the case that another system has sent an identical amount to an account of the central bank provided for this purpose, for example, with the corresponding blockchain address as the intended purpose.

As neither the banknote nor its blockchain address are assigned to a legal or natural person, the banknote enables, for example, both cash-based and also cashless, anonymous payments, as they are currently only possible with cash. In order to prevent misuse, for example, additional limitations might be implemented in the blockchain or in the underlying blockchain network, which limit transferable amounts of money and/or provide additional verification mechanisms at certain amounts of money. Corresponding verification mechanisms might require, for example, a confirmation of the transaction by the central bank on the basis of a verification of additional indications determined to be necessary for the corresponding transaction.

The banknote and thus its nominal value according to the blockchain may, for example, be passed on by a physical manual transfer, i.e., a digital currency may be transferred. For this purpose, for example, no account in the classical meaning, i.e., an account assigned to a legal or natural person, is necessary. For example, materials and expenses may be saved by reducing purely analog currency. In particular, the expense for the physical transfer and transport of banknotes may be reduced. Such a banknote may be, for example, revalued and used for direct contactless payment, without or with only limited control or follow up, as an individual banknote may be passed on at any time in the case of classical cash.

For example, the current nominal value of the banknote is additionally stored in the memory of the security element. Crucial for the actual nominal value of the banknote is its nominal value according to the blockchain. For example, the nominal value stored in the banknote may be used in an offline determination of the current nominal value. For example, the nominal value stored in the banknote is updated if, at the conclusion of a transaction, a transaction confirmation and/or an entry confirmation signed by the central bank is forwarded to the banknote. For example, the security element has a signature verification key for verifying digital signatures of the central bank.

The banknote may be, for example, paper-based and/or plastic-based. For example, the banknote comprises one or more material layers. For example, paper, plastics, and/or metal films may be used as materials for the material layers. A material layer may also comprise combinations of several of these materials. For example, the material layers are laminated together. The material layers may comprise, in particular, electronic components, for example, a security element with a processor and memory, an antenna, a display, an input device, and/or sensors, or be formed in combination with one another. The banknote is flexible, for example, The banknote comprises, for example, a plurality of security features which allow the authenticity and validity of the banknotes to be verified. The plurality of security features may comprise, for example, one or more level 1, level 2, and/or level 3 security features. Level 1 security features are security features which may be directly recognized by human beings and may be checked without additional aids. Level 2 security features are machine-readable security features, which are used, for example, for commercial requirements for authenticity verification of banknotes. Level 3 security features are security features which are only known to the issuing central bank. Central banks use such machine-readable security features, which are kept secret, in order to ensure the integrity of the cash cycle and to guarantee that only genuine banknotes are passed on in circulation. Furthermore, central banks use such level 3 security features in order to remove genuine banknotes as necessary from circulation and to destroy them in a controlled way, if the fitness for circulation of the corresponding banknotes is no longer sufficient, for example, due to contamination and/or wear.

The security features may comprise, for example, tactile, acoustic, or visual features. For example, materials are used for the production of the banknote, for example, security papers, with a characteristic haptic impression and/or a characteristic sound when rubbed and/or crumpled. For example, haptically detectable embossings are introduced into the banknote. For example, visually detectable security features, for example, watermarks, see-through windows, see-through registers, register printing elements, film elements, guilloches, iris printing elements, anti-copying grids, mottled fibers, micro-perforations, microprinting, optically variable printing inks, pearlescent strips, security threads and/or special colors are used. For example, security elements, for example, metameric color combinations, fluorescent colors, diffractive optical elements and/or scrambled indicia microprinted patterns are used.

For example, machine-readable security elements are used, for example, infrared properties of the printing ink, phosphorescent inks, magnetic elements, elements with characteristic electrical conductivity and/or copy protection elements, for example, a digital watermark and/or standardized patterns, for example a EURion constellation or Omron rings For example, the banknote comprises one or more security features, which are only known to the issuing central bank and/or are verifiable by the same, i.e., level 3 security features, for example, the M feature of the ECB.

Security features, in particular level 1 and level 2 security features, may have the advantage that they enable the participants to verify a banknote without much expense regarding its validity, i.e., to verify authenticity and validity. The enables a use of the banknote for cash payments, which comprise a transfer of the banknote from a payer to a payee.

A "blockchain" is understood here and in the following as an organized data structure which comprises a plurality of data blocks chained to one another. In particular, a blockchain is understood to be an organized data structure, in which each of the blocks (except for the first block), comprises a verification value, for example, a hash value of its previous block and thus, based on each block, the validity of all of its previous blocks may be verified and, if necessary, confirmed. For examples of a blockchain, compare https://en.wikipedia.org/wiki/Block_chain_(database) and "Mastering Bitcoin", Chapter 7, The Blockchain, pages 161 ff. The concept of the blockchain was described, for example, in 2008 in a White Paper regarding bitcoin under the pseudonym Satoschi Nakamoto ("Bitcoin: Peer-to-Peer Electronic Cash System" (https://bitcoin.org/bitcoin.pdf)). The blockchain described therein consists of a row of data blocks, in which one or more entries or transactions is/are compiled in each case and is/are provided with a checksum in the form of a hash value. Additional blocks of the blockchain are generated, for example, in a computationally-intensive process, which is also designated as so-called mining. The additionally generated blocks are subsequently added to the blockchain and distributed via a network to all participants, or nodes of the network.

Embodiments may have the advantage that the blockchain offers a high degree of security with respect to subsequent manipulation due to the storage of cryptographic checksums, i.e., hash values, of the previous blocks in the respectively downstream block. The chaining of the blocks may then be checked using this root hash value. Each block of the blockchain includes the hash of the entire previous block header in its header. Thus, the series of the blocks is uniquely established and a chain structure arises. Due to the chaining of the individual blocks to one another thus implemented, it is achieved that a subsequent modification of previous blocks or individual entries is virtually excluded, as the hash values of all subsequent blocks would have to likewise be recalculated for this in a short time.

A blockchain may also be implemented, for example, in the form of a blockchain, wherein only a selected group of participants possesses an authorization to add valid blocks. A corresponding authorization may be demonstrated, for example, by means of a signature using a private cryptographic key. The private cryptographic key may belong to an asymmetric key pair, to which a public cryptographic key also belongs, with which the signature may be verified. A certificate, which proves the authorization to generate a valid block of the blockchain, for example, may be assigned to the asymmetric key pair. Furthermore, this certificate may be assigned to a PKI, which proves the authenticity of the certificate. According to another embodiment, a public key may be stored in the blockchain in an initialization entry, for example, for additional participants, who are to be added to the selected group. On the basis of this public key, it may be verified if signatures of blocks, and thus the corresponding blocks themselves, are valid. Public keys of the original participants of the select group may be stored, for example, in a genesis block of the blockchain.

The blockchain, managed by one of the central banks, is, for example, a public blockchain, which is maintained on blockchain servers of the central bank. For example, an entry of new blocks is carried out exclusively by these blockchain servers managed by the central bank. In this case, for example, the computationally-intensive process of adding additional blocks may be omitted. For example, merely a signature with a signature key assigned to the central bank is necessary for adding additional blocks.

A consensus may also be implemented in a blockchain in other ways. Thus, for example, a consensus may be achieved in that votes are cast about an admission of proposed entries into the blockchain. For example, each participant or blockchain server maintains a unique list of other participants, which he/it trusts as a group. Each participant may propose additional entries, which are to be admitted into an additional block of the blockchain. Votes are cast about the admission and thus the acknowledgement of the validity of the proposed entries. Thus, for example, each participant only votes about those proposals which originate from participants of his/its list. In other words, only the votes of those participants, who are included by the list of that participant, who made the corresponding proposal, are considered for the decision, whether a proposal for an additional entry is acknowledged as valid, i.e., whether a consensus exists between the participants regarding the validity of this entry. In order for a proposal for an entry to be accepted as valid, a certain minimum percentage of participants entitled to vote must vote yes, for example, 80%, 90%, 95%, or 100%. All proposed entries, which satisfy this criterion, are admitted into the blockchain. This type of voting may comprise multiple rounds. All other proposals, which do not satisfy the previously mentioned criterion, are discarded or are voted on again when votes are cast about the next block of the blockchain. The previously mentioned lists represent subgroups of the blockchain network, which the participant, who maintains the respective list, trusts as a group as a whole, without being required to trust each individual participant of the list. The Ripple Protocol Consensus Algorithm offers an example for this type of consensus procedure (David Schwartz et al.: "The Ripple Protocol Consensus Algorithm", Ripple Labs Inc., 2014, https://ripple.com/files/ripple_consensus_whitepaper.pdf).

A "communication interface" is understood here to be, for example, an interface, via which data may be received and sent, wherein the communication interface may be configured to be contact-based or contactless.

Communication may be carried out, for example, via a network. A "network" is understood here to be any transmission medium with a connection for communicating, in particular a local connection or a local network, in particular a Local Area Network (LAN), a private network, in particular an intranet, and a digital private network (Virtual Private Network—VPN). For example, a computer system may have a standard wireless interface for connecting to a WLAN. Furthermore, it may be a public network, for example, the internet. Depending on the embodiment, this connection may also be established via a mobile network.

Contactless communication with the banknote is possible, for example, by means of Near Field Communication (NFC). This is communication based on RFID technology for the contactless exchange of data per electromagnetic induction by means of loosely coupled coils over short distances, for example, of a few centimeters. NFC may be implemented, for example, according to one of the ISO standards 14443, 18092, 21481, ECMA 340, 352, 356, 362, or ETSI TS 102 190.

The communication interface of the banknote comprises, for example, an antenna for contactless communication. The antenna comprises, for example, an induction coil. The induction coil may be further configured for supplying external energy to the banknote, for example, by means of energy harvesting. For example, the induction coil is configured such that a terminal couples energy into the banknote.

A "processor" is understood here and subsequently to be a logic circuit, which functions to execute program instructions. The logic circuit may be implemented on one or more discrete components, in particular on a chip. A processor comprises, for example, an arithmetic unit, a control unit, registry, and data lines for communicating with other components.

In particular, a "processor" is understood to be a microprocessor or a microprocessors system made from multiple processor cores and/or multiple microprocessors.

A "memory" is understood here to be a non-volatile memory. A "non-volatile memory" is understood here to be, for example, an electronic memory for permanent storage of data. A non-volatile memory may be configured as a non-changeable memory, which is also designated as a Read-Only Memory (ROM), or as a changeable memory, which is also designated as a Non-Volatile Memory (NVM). In particular, it may herein designate an EEPROM, for example, a Flash EEPROM, or Flash for short. A non-volatile memory is characterized in that the data stored therein are retained, even after the energy supply is switched off.

A "protected memory area" is understood here to be an area of an electronic memory, to which access, that is, read access or write access, is only possible via a processor of the security element. For example, no external access to the protected memory area is possible, i.e., data may neither be entered here from outside nor output to the outside. For example, data may be read from the protected memory area to the outside via the processor. For example, data may be entered into the protected memory area from the outside via the processor. According to embodiments, access from or via the processor coupled to the memory is then only possible when a condition, required for this purpose, is satisfied. This may be, for example, a cryptographic condition, in particular, a successful authentication and/or a successful authorization verification. Such a verification may be based, for example, on an electronic signature with a signature key.

Asymmetric key pairs are used for a plurality of cryptosystems and also play an important role in the signature of electronic documents. An asymmetric key pair consists of a public key, which is used to decrypt or to encrypt data and may be forwarded to a third party, and also a private key, which is used decrypt or to encrypt data and must be kept secret as a rule. The public key allows anyone to encrypt data for the owner of the private key and to verify digital signatures generated with the private key. The private key allows its owner to decrypt data encrypted with the public key or to generate digital signatures. A signature generated with a private key may be verified with the associated public key.

The generation of a digital signature, designated in the following simply as a "signature", is a cryptographic method in which an additional data value, which is designated as a "signature" is calculated for any data. A signature may be, for example, a hash value of the output data encrypted with a private cryptographic key.

A security element is understood here to be, for example, an electronic component, which comprises a processor and a memory, and on which only certain predefined accesses are enabled. For example, only certain data values, which are stored, for example, in certain areas of the memory, may be read. For example, data values stored in a protected memory area may not be read. For example, a digital signature, whose verification key is stored in the security element, is necessary for writing a data value into the memory of the security element. For example, only the processor has write access for writing data into a protected memory area.

The security element further provides, for example, cryptographic core routines in the form of cryptographic program instructions with cryptographic algorithms for generating and/or verifying signatures, generating keys, and/or generating random numbers, and may further function as a secure memory for cryptographic keys.

For example, at least parts of the security element are signed. Prior to using the security element, it is verified whether the signature(s) is/are valid. If one of the signatures is not valid, use of the security element is, for example, blocked.

For example, the security element has physically limited accessibility. In addition, the security element I may have additional measures against misuse, in particular, against unauthorized access to data in the memory of the security element. For example, a security element comprises sensors for monitoring the state of the security element and also its surroundings, in order to recognize deviations from normal operation which may indicate attempts at manipulation. Corresponding sensor types comprise, for example, a clock frequency sensor, a voltage sensor, and/or a light sensor. Clock frequency sensors and voltage sensors detect, for example, deviations in the clock frequency, temperature, and/or voltage above or below a predefined normal range. In particular, a security element may comprise non-volatile memories with a protected memory area.

For example, the means for protecting the security element against unauthorized manipulation comprise mechanical means, which are to prevent, e.g., the opening of the security element or its parts, or rendering the security element unusable upon an attempt to intervene in the same, for example, in that a data loss occurs. For example, at least parts of the security element may be enclosed, cast, and/or laminated into a material, the attempted removal of which leads to an inevitable destruction of the corresponding parts of the security element The visual indications are, for example, information which is incorporated into the banknote in an optically readable form. For example, this information is printed, embossed, engraved, punched out of, cut out or, or incorporated into the banknote and/or a material layer of the banknote in an otherwise optically detectable way. These visual features are detectable, for example, with an optical sensor, for example, a camera.

For example, during a payment process, the current nominal value of the banknote may initially be verified. A blockchain query for the current nominal value of the blockchain address of the banknote may thereby be used for example. In response to the request, a g of the blockchain address of the banknote is received. To generate the query, the serial number of the banknote may be, for example, electronically detected, i.e., read from the memory of the banknote, and/or a visual indication of the serial number may be detected with an optical sensor. For example, both may also be carried out, i.e., reading from the memory and scanning the visual indication, with a subsequent comparison of the results from both detection methods. If the serial number read out does not match the scanned in serial number, this is otherwise not accepted. This may offer protection against manipulation of the banknote. In particular, it might thus be prevented that, a security element of another banknote with a different serial number, to whose blockchain address a much lower current nominal value is assigned, is introduced into a counterfeit banknote with a visual indication of a serial number, to whose blockchain address a higher current nominal value is assigned. In a cash payment with such a manipulated banknote, there would otherwise be the risk that the payee, upon receiving the banknote, assumes a current nominal value of the banknote, which is substantially higher than the actual nominal value of the banknote. The serial number of the banknote is assigned to the blockchain address of the banknote, for example, in an initialization entry of the blockchain address in the blockchain.

Instead of the serial number, another identifier of the blockchain address of the banknote may also be detected and used in the previously described way. The corresponding identifier may be, for example, the public cryptographic key of the banknote, from which the blockchain address may be derived, for example, using a hash function. The corresponding identifier may be, for example, the corresponding blockchain address itself.

The actual nominal value of a banknote is determined, for example, solely from the nominal value of the blockchain address which is assigned to the banknote. In order to be able to draw on the nominal value assigned to the corresponding blockchain address, ownership of a genuine banknote with a private cryptographic key assigned to the corresponding blockchain address is necessary.

During a payment process with the banknote, one or more security features of the banknote may be verified, prior to sending a payment request, in order to ensure that the banknote is a genuine banknote, i.e., an authentic and valid banknote.

For example, it may be decided, based on the determined current nominal value, whether a cash payment or a cashless payment is to be carried out with the banknote. If the current nominal value is identical with the amount to be paid, a cash payment is carried out, for example, in which the banknote is transferred to the payee and the ownership of the same transfers to the payee. If the current nominal value is greater than the amount to be paid, for example, a cashless payment is carried out. In the cashless payment, for example, a corresponding payment request is sent to the banknote for a payment in the form of a transaction of an amount to be paid from the blockchain address of the banknote to a blockchain address of a payee. The banknote may authorize this transaction with a signed transaction approval.

If the current nominal value is greater than the amount to be paid, it would likewise be possible that a cash payment is carried out, and the excess amount is reimbursed by the payee as change, for example, in the form of cash, for example, banknotes with a suitable nominal value.

For example, the current nominal value may assume any positive value including zero. For example, the current nominal value may assume any value between zero and a predetermined maximum nominal value. For example, the current nominal value may assume any value greater than or equal to a predetermined minimum nominal value. For example, the current nominal value may assume any value from and including a predetermined minimum nominal value up to and including a predetermined maximum nominal value.

For example, the nominal value of the banknote may comprise a guaranteed minimum nominal value and a variable additional nominal value percentage. The minimum nominal value may be paid, for example, only in the form of a cash payment with the transfer of the banknote, while the variable additional nominal value percentage may be used in the context of a cash-based or cashless payment process. In other words, only cashless payments, in which the remaining nominal value of the banknote is greater than or equal to the minimum nominal value, may be carried out with the banknote. If an amount is to be paid with the banknote would result in a remaining nominal value, which would be less than the minimum nominal value, a cashless payment is blocked, for example, via the blockchain. Consequently, a cash-based payment must be carried out, for example, in which the banknote is transferred. If the current nominal value of the banknote is greater than the amount to be paid, the remaining difference amount may be refunded by the payee, for example, in the form of change.

For example, the initial nominal value for the banknote or its blockchain address is entered in the blockchain. For example, the visual configuration, the security features incorporated, and/or the format of the banknote is/are dependent on its initial nominal value. Thus, banknotes with a different initial nominal value differ from one another, for example, with respect to their visual configuration, the security features incorporated, and/or the format. Banknotes with an identical initial nominal value have, for example, an identical visual configuration, identical security features, and/or format, except for one or more banknote-specific indications, for example, serial number, information about the year of issue, etc.

For example, the banknote comprises a visual indication of the minimum nominal value. For example, the minimum nominal value for the banknote or its blockchain address is entered in the blockchain. For example, the visual configuration, the security features incorporated, and/or the format of the banknote is/are dependent on its minimum nominal value. Thus, banknotes with different minimum nominal values differ from one another, for example, with respect to their visual configuration, the security features incorporated, and/or the format. Banknotes with identical minimum nominal values have, for example, an identical visual configuration, identical security features, and/or format, except for one or more banknote-specific indications, for example, serial number, information about the year of issue, etc.

For example, the initial nominal value assigned to the banknote, which the banknote comprises as a visual indication, is the total nominal value which is assigned to the banknote in the context of its initialization in the blockchain. For example, the total nominal value, initially assigned to the banknote, is the guaranteed minimum nominal value and an initial additional nominal value percentage. The additional nominal value percentage is, for example, variable depending on the transactions which are executed using the blockchain address of the banknote. For example, the visually indicated initial nominal value is a percentage of the total nominal value, which is assigned to the banknote in the context of its initialization in the blockchain. For example, the corresponding percentage is the minimum nominal value, wherein the actual total nominal value may initially be greater, i.e., may comprise an initial additional nominal value percentage. For example, the total nominal value, which is assigned to the banknote in the context of its initialization in the blockchain, is a minimum nominal value of the banknote, which, for example, is visually indicated on the banknote. In this case, the visual indication of the initial nominal value is, for example, simultaneously a visual indication of the minimum nominal value of the banknote, For example, the minimum nominal value differs from the initial nominal value. In this case, the banknote comprises, for example, a visual indication of the minimum nominal value in addition to the visual indication of the initial nominal value.

Adding a variable additional nominal value percentage or increasing an existing variable additional nominal value percentage is carried out, for example, by a transaction of a corresponding amount to the blockchain address of the banknote. The transaction may originate from another blockchain address, for example, a blockchain address of another banknote or of the central bank. For example, the variable additional nominal value percentage is indefinitely increasable. For example, the variable additional nominal value percentage is increasable depending on the minimum nominal value and/or on the initial nominal value. For example, a maximum permissible variable additional nominal value percentage is entered in the blockchain for the blockchain address of the corresponding banknote. For example, the maximum permissible variable additional nominal value percentage of the banknote is 100%, 200%, 300%, 400%, 500%, 600%, 700%, 800%, 900%, or 1000% of the minimum nominal value of the banknote. For example, during a transaction to a blockchain address of a banknote, it is verified, as a prerequisite for executing the transaction, whether the maximum permissible variable additional nominal value percentage is exceeded by the transaction. In the case that the maximum permissible variable additional nominal value percentage is not exceeded, the transaction is executed, i.e., entered into the blockchain. In the case that the maximum permissible variable additional nominal value percentage is exceeded, the transaction is not executed, i.e., not entered into the blockchain.

According to embodiments, the banknote comprises the visual indication of the serial number distributed multiple times across the banknote. Embodiments may have the advantage that the serial number may be detected even in the case of partial damage to the banknote. For example, indications of the serial number, in combination with and/or as components of multiple security features of the banknote, are incorporated into the same. This might have the advantage that, as long as sufficient security features are present for confirming the authenticity and validity of the banknote, the serial number of the banknote may be detected.

According to embodiments, the banknote comprises the visual indication of the initial nominal value and/or the minimum nominal value likewise distributed multiple times across the banknote. For example, indications of the initial nominal value and/or of the minimum nominal value, in combination with and/or as components of multiple security features of the banknote are incorporated, into the same. For example, one or more of the security features of the banknote depend on the initial nominal value and/or on the minimum nominal value of the banknote.

According to embodiments, the plurality of indications of the serial number is distributed across the banknote in such a way that it may be ensured that the serial number of the banknote may be determined as long as more than 50% of the banknote is present. Embodiments may have the advantage that that, in the case of loss of a part of the banknote, it may be ensured that, as long as more than 50% of the banknote is present, which is, for example, a prerequisite for replacing the banknote, the remaining more than 50% comprises the serial number of the banknote. Thus, even in the case of a partial loss of the banknote, it may be ensured that, as long as the remaining part(s) of the banknote is/are valid, the serial number may be detected and the current nominal value of the banknote may be determined according to the blockchain address of the banknote.

According to embodiments, a banknote-specific public cryptographic key of the asymmetric key pair of the banknote, from which the blockchain address of the banknote is derivable, is further stored in the memory. According to embodiments, the blockchain address of the banknote is further stored in the memory.

According to embodiments, the banknote further comprises a visual indication of the banknote-specific public cryptographic key. According to embodiments, the banknote further comprises a visual indication of the blockchain address of the banknote.

According to embodiments, the banknote comprises a plurality of security features. Embodiments may have the advantage that using the security features, which are, for example, level 1, level 2, and/or level 3 security features, may enable the authenticity and validity of the banknote to be verified. According to embodiments, one or more security features of the plurality of security features comprise(s) an indication of the serial number, the banknote-specific public cryptographic key, and/or the blockchain address of the banknote. Embodiments may have the advantage that, during a detection of the corresponding one or more security features, the serial number, the banknote-specific public cryptographic key, and/or the blockchain address of the banknote may also be detected as well. As a component of the corresponding security features, not only the authenticity and validity of the banknote in itself, but also the authenticity and validity of the serial number, the banknote-specific public cryptographic key, and/or the blockchain address of the banknote may be verified by way of the security features. Thus, for example, a connection or assignment of the physical banknote and the blockchain address of the banknote may be provided by the corresponding security features, which connection or assignment is identifiable, for example, using the serial number, the banknote-specific public cryptographic key, and/or the blockchain address of the banknote. According to embodiments, one or more security features, which comprise(s) an indication of the serial number, the banknote-specific public cryptographic key, and/or the blockchain address of the banknote, is/are, for example, level 1, level 2, and/or level 3 security features.

According to embodiments, the banknote comprises the visual indication of the public cryptographic key and/or the blockchain address distributed multiple times across the banknote. Embodiments may have the advantage that the public cryptographic key and/or the blockchain address may be detected even in the case of partial damage to the banknote. For example, indications of the public cryptographic key and/or the blockchain address, in combination with and/or as components of multiple security features of the banknote, are incorporated into the same. This might have the advantage that, as long as sufficient security features are present for confirming the authenticity and validity of the banknote, the public cryptographic key and/or the blockchain address of the banknote may be detected.

According to embodiments, the plurality of indications of the public cryptographic key and/or the blockchain address is distributed across the banknote in such a way that it may be ensured that the public cryptographic key and/or the blockchain address of the banknote may be determined as long as more than 50% of the banknote is present. Embodiments may have the advantage that that, in the case of loss of a part of the banknote, it may be ensured that, as long as more than 50% of the banknote is present, which is, for example, a prerequisite for replacing the banknote, the remaining more than 50% comprises the public cryptographic key and/or the blockchain address of the banknote. Thus, even in the case of a partial loss of the banknote, it may be ensured that, as long as the remaining part(s) of the banknote is/are valid, the public cryptographic key and/or the blockchain address may be detected and the current nominal value of the banknote may be determined according to the blockchain address of the banknote.

According to embodiments, the banknote generates the transaction approval using the information of the payment request. Embodiments may have the advantage that the banknote may take over the corresponding information directly from the payment request. According to embodiments, the payment request comprises the complete transaction information, which the banknote signs as the transaction approval. The complete transaction information comprises, for example, the blockchain address of the banknote, in addition to the amount to be paid and the blockchain address of the payee.

According to embodiments, the public cryptographic key of the banknote is provided by the banknote for deriving the blockchain address of the banknote for the payment request. According to embodiments, the public cryptographic key of the banknote is provided as a visual indication, for reading, in particular, for machine reading. For example, the visual indication comprises and alphanumeric character string, a bar code, or a QR code of the public cryptographic key. According to embodiments, the public cryptographic key is sent by the banknote to generate the payment request. The sending is carried out, for example, in response to a request for the public cryptographic key. Embodiments may have the advantage that the blockchain address of the banknote, derivable from the public cryptographic key, may be provided for generating the payment request, without necessitating another authority for this aside from the banknote.

According to embodiments, the blockchain address of the banknote is provided by the banknote for the payment request. According to embodiments, the blockchain address of the banknote is provided as a visual indication, for reading, in particular, for machine reading. For example, the visual indication comprises an alphanumeric character string, a bar code, or a QR code of the blockchain address of the banknote. According to embodiments, the blockchain address of the banknote is sent by the banknote to generate the payment request. The sending is carried out, for example, in response to a request for the blockchain address of the banknote. Embodiments may have the advantage that the blockchain address of the banknote may be provided for generating the payment request, without necessitating another authority for this aside from the banknote.

According to embodiments, the banknote comprises a communication interface for communicating with a terminal. The banknote receives the payment request from the terminal via the communication interface and/or sends the signed transaction approval to the terminal via the communication interface. The terminal may be, for example, a terminal of a seller at a point of sale (PoS), i.e., at the location at which a sale is completed. The terminal may further be a terminal which is connected to a user computer system, via which a payment is to be processed with the banknote. For example, this is a payment process via a network, for example, the internet, with respect to a service provider, whether it is a seller or a payment service provider. The terminal might likewise be provided in the form of a mobile portable communication device, for example, a smartphone of a user. The user might use, for example, the mobile portable communication device for a processing a payment via a network, for example, the internet, with respect to a service provider, whether it is a seller or a payment service provider.

According to embodiments, the banknote comprises a user interface for communicating with a user of the banknote, wherein the banknote receives the payment request from a user via an input device of the user interface and/or sends the signed transaction approval to the user interface for output via a display device of the user interface. Embodiments may have the advantage that the data, which is entered into the banknote and which the banknote outputs, is visible to and/or controlled by the user.

The input device may comprise, for example, a touch pad. The display device may comprise, for example, a display. The input device may be combined, for example, with the display device, for example, in the form of a touch display. The user enters the data of the payment request, for example, using the input device in the banknote.

For example, the payment request and/or the transaction approval is displayed to the user on the display device of the banknote. A confirmation of the displayed payment request and/or transaction approval by the user, using the input device of the banknote, is, for example, a prerequisite for generating and/or signing the transaction approval.

For example, the signed transaction approval is sent to the display device of the banknote for display, for example, as an alphanumeric character string, barcode, or QR code. The signed transaction approval displayed on the display device may be scanned or read, for example, using an optical sensor, for example, a sensor of a terminal.

According to embodiments, a current nominal value of the banknote is further stored in the memory of the security element. Embodiments may have the advantage that the current nominal value may be read from the banknote. For example, it determines the actual binding nominal value of the banknote via the blockchain with the current nominal value stored at the blockchain address of the banknote, i.e., the current nominal value resulting from the balance sheet of the transactions stored in the blockchain in cooperation with the blockchain address of the banknote.

For example, the current nominal value is stored in the protected memory area of the memory of the security element. For example, the current nominal value is not stored in the protected memory area of the memory of the security element. For example, the current nominal value of the banknote, stored in the memory of the security element, is externally readable. For example, the current nominal value of the banknote, stored in the memory of the security element, is not externally readable. For example, the current nominal value of the banknote, stored in the memory of the security element, functions solely for an internal verification, for example, of whether an amount to be paid is less than or equal to the current nominal value of the banknote.

According to embodiments, a serial number of the banknote is further stored in the memory of the security element.

According to embodiments, the initial nominal value of the banknote is initially stored as a current nominal value in the memory of the security element. Embodiments may have the advantage that, starting from this initial nominal value, the stored nominal value is adjusted for each successfully processed payment, and thus the current nominal value may be traced on the banknote-side.

According to embodiments, the processor is further configured to execute the program instructions to match the amount to be paid with the stored current nominal value of the banknote, and to generate the signed transaction approval to authorize the transaction only under the prerequisite that the stored current nominal value is greater than or equal to the amount to be paid. Embodiments may have the advantage that it may be ensured that the current nominal value is sufficient for the payment to be executed.

According to embodiments, the processor is further configured when executing the program instructions to execute an updating process to update the stored current nominal value of the banknote. The updating process comprises:

Receiving an update request to update the current nominal value of the banknote stored in the memory of the security element, wherein the update request comprises an updated nominal value of the banknote together with a cryptographically-secured confirmation of the issuing central bank for the updated nominal value, Verifying the cryptographically-secured confirmation using a cryptographic verification key stored in the memory of the security element.

In the case of a successful verification, replacing the current nominal value of the banknote, stored in the memory of the security element, with the updated nominal value received.

Embodiments may have the advantage that it may be ensured that the stored nominal value is updated. According to embodiments, the cryptographic verification key is a cryptographic verification key stored in the memory of the security element in addition to the asymmetric key pair of the banknote, for example, a public cryptographic key of an asymmetric key pair assigned to the central bank. The signature verification key is, for example, stored in the security element in the context of the production of the banknote.

According to embodiments, the update request is received in response to the sending of the signed transaction approval. For example, the confirmation of the central bank for the updated nominal value is a transaction confirmation of the central bank, in particular a confirmation of an entry of the transaction into the blockchain. For example, the updated nominal value is the previous nominal value of the banknote minus the amount paid.

According to embodiments, the update request is sent in response to a transaction of an additional amount to the blockchain address of the banknote. For example, the updated nominal value is the previous nominal value of the banknote plus the additional amount. Embodiments may have the advantage that changes to the nominal value in the context of a transaction of an additional amount to the blockchain address of the banknote are also taken into consideration.

Embodiments comprise a method for issuing a banknote. The issuing procedure comprises:

Producing the banknote, wherein the banknote further comprises a security element with a processor and a memory with program instructions, Generating a banknote-specific asymmetric key pair with a private and a public cryptographic key by the banknote, Storing the generated banknote-specific asymmetric key pair in the memory by the banknote, wherein the private cryptographic key is stored in a protected memory area of the memory, Outputting the generated public cryptographic key by the banknote to initialize a banknote-specific blockchain address derived from the public cryptographic key by a central bank issuing the banknote in a blockchain, wherein the blockchain address of the banknote is assigned in the context of the initialization of the initial nominal value.

According to embodiments, the produced banknote comprises, for example, a visual indication of a serial number uniquely identifying the banknote. According to embodiments, the produced banknote comprises, for example, a visual indication of an initial nominal value assigned to the banknote.

Embodiments may have the advantage that the banknote or the banknote body is produced or printed. In addition to visual indications and security elements, for example, as known banknotes also have them, the banknote additionally comprises a security element with a processor and a memory with program instructions. These program instructions comprise, for example, cryptographic program instructions for generating a banknote-specific asymmetric key pair with a private and a public cryptographic key by the banknote. In order for the banknote to be valid, it must be entered, for example, into the blockchain. To this end, a banknote-specific blockchain address is derived from the public cryptographic key. This derivation may be carried out by the banknote itself, and/or by an external computer system, for example, a computer system of the central bank which manages the blockchain. In the context of an initialization of the blockchain address of the banknote by the issuing central bank, for example, an initial nominal value assigned to the banknote or to the serial number of the banknote, is entered into the blockchain. This entry may be carried out, for example, in the form of a transaction with the corresponding amount and, if necessary, additional information from a blockchain address of the central bank to the blockchain address of the banknote. The additional information comprises, for example, the serial number of the banknote, a minimum nominal value of the banknote, and/or an additional nominal value percentage of the banknote. Alternatively, the assignment of the initial nominal value to the blockchain address might also be carried out by an entry of the central bank, e.g., an entry signed by the central bank, which comprises the blockchain address, the initial nominal value, and/or additional information related to the banknote initialized by the entry. The additional information comprises, for example, the serial number of the banknote, a minimum nominal value of the banknote, and/or an additional nominal value percentage of the banknote.

According to embodiments, the issuing procedure is configured to issue or produce each of the previously described embodiments of the banknote. According to embodiments, the banknote issued using the issuing procedure is a banknote according to one of the previously described embodiments.

According to embodiments, the method further comprises sending a production confirmation to the issuing central bank to confirm the production of the banknote. The production confirmation comprises the serial number and the public cryptographic key of the produced banknote for initializing a banknote-specific blockchain address derived from the public cryptographic key by the issuing central bank in the blockchain. According to embodiments, the production confirmation further comprises an indication of an initial nominal value and/or a minimum nominal value of the banknote.

Embodiments may have the advantage that all information necessary for initializing the banknote in the blockchain is provided to the central bank the by production confirmation. Alternatively or additionally, information characterizing the banknote is confirmed to the central bank by the production confirmation. For example, the central bank specifies to the manufacturer of the banknote in a tender, which serial numbers are to be used for producing banknotes with which initial nominal values and/or minimum nominal values. The production confirmation confirms to the central bank which banknote were actually produced with which serial numbers and which initial nominal value and/or minimum nominal value.

According to embodiments, the initialization comprises a registration of the blockchain address of the banknote by an initialization or registration entry by the issuing central bank in the blockchain. According to embodiments, the registration entry comprises the blockchain address of the banknote and the initial nominal value assigned to the banknote. According to embodiments, the registration entry is signed using a private cryptographic key of the issuing central bank. According to embodiments, the registration entry has the form of a transaction of the initial nominal value from the issuing central bank, for example, from a blockchain address assigned to the central bank, to the blockchain address of the banknote. According to embodiments, the registration entry comprises the serial number of the banknote. According to embodiments, an assignment of the serial number of the banknote to the blockchain address of the banknote and/or the public key of the banknote is stored in an additional registry of the issuing central bank, wherein the serial number functions as a database access key for reading the blockchain address and/or the public key of the banknote.

According to embodiments, the banknote is produced upon receiving an order from a central bank issuing the banknote. According to embodiments, an indication is received of the predefined range of serial numbers. According to an embodiment, an indication is received of the initial nominal value and/or minimum nominal value provided for the banknote.

Embodiments comprise a method for using a banknote. The banknote comprises a security element with a processor and a memory. A banknote-specific private cryptographic key of an asymmetric key pair of the banknote is stored in a protected memory area of the memory. The asymmetric key pair is assigned to a banknote-specific blockchain address of a blockchain managed by a central bank issuing the banknote.

The processor is thereby configured to execute a payment method with the banknote when executing the program instructions. The payment method comprises:
  Receiving a payment request for a payment with the banknote in the form of a transaction of an amount to be paid from the blockchain address of the banknote to a blockchain address of a payee, wherein the payment request specifies the amount to be paid and the blockchain address of the payee.
  Signing a transaction approval with the private cryptographic key of the banknote, wherein the transaction approval comprises the blockchain address of the banknote, the blockchain address of the payee and the amount to be paid,
  Sending the signed transaction approval.

According to embodiments, an additional transaction-specific value is sent together with the signed transaction approval. For example, the additional transaction-specific value is included with the signature of the transaction approval and/or is appended to the signed transaction approval. The additional transaction-specific value is, for example, a timestamp and/or a random number.

According to embodiments, the banknote comprises, for example, a visual indication of a serial number uniquely identifying the banknote. According to embodiments, the banknote comprises, for example, a visual indication of an initial nominal value assigned to the banknote.

Embodiments may have the advantage that the banknote, as already previously described, may be used not only for a cash payment, but additionally for a cashless payment.

According to embodiments, the banknote used for payment is a banknote according to one of the previously described embodiments.

According to embodiments, a banknote-specific public cryptographic key of the asymmetric key pair of the banknote, from which the blockchain address of the banknote is derivable, is further stored in the memory. According to embodiments, the blockchain address of the banknote is further stored in the memory. Embodiments may have the advantage that the banknote includes the blockchain address and/or may derive the same.

According to embodiments, the banknote further comprises a visual indication of the banknote-specific public cryptographic key. According to embodiments, the banknote further comprises a visual indication of the blockchain address of the banknote. In the case that the banknote comprises a visual indication of the banknote-specific public cryptographic key and/or the blockchain address of the banknote, the generation of the banknote-specific asymmetric key pair is carried out, for example, during the production of the banknote, so that the banknote-specific public cryptographic key and/or the blockchain address of the banknote may be, for example, printed on the banknote or otherwise incorporated into the banknote in the context of the production. Alternatively or additionally, the banknote may comprise a display device on which the banknote-specific public cryptographic key and/or the blockchain address of the banknote, stored in the memory of the security element, may be displayed as a visual indication.

According to embodiments, the banknote generates the transaction approval using the information of the payment request. According to embodiments, the payment request comprises the complete transaction information, which the banknote signs as the transaction approval.

According to embodiments, the public cryptographic key of the banknote is provided by the banknote for deriving the blockchain address of the banknote for the payment request. According to embodiments, the public cryptographic key of the banknote is provided to be read as a visual indication. According to embodiments, the public cryptographic key is sent by the banknote.

According to embodiments, the blockchain address of the banknote is provided by the banknote for the payment request. According to embodiments, the blockchain address of the banknote is provided to be read as a visual indication. According to embodiments, the blockchain address of the banknote is sent by the banknote.

According to embodiments, the banknote comprises a communication interface for communicating with a terminal. The banknote receives the payment request from the terminal via the communication interface and/or sends the signed transaction approval to the terminal via the communication interface.

According to embodiments, the banknote comprises a user interface for communicating with a user of the banknote, wherein the banknote receives the payment request from a user via an input device of the user interface and/or sends the signed transaction approval to the user interface for output via the display device of the user interface.

Embodiments comprise a method for processing payments using a terminal. The payment is carried out with a banknote, which comprises a communication interface for communicating with the terminal and a security element with a processor and a memory. A banknote-specific private cryptographic key of an asymmetric key pair of the banknote is stored in a protected memory area of the memory. The asymmetric key pair is assigned to a banknote-specific blockchain address of a blockchain managed by a central bank issuing the banknote. The terminal comprises a processor, a memory, and a communication interface for communicating with the banknote.

The method for processing a payment transfer through the terminal comprises:

Sending a payment request to the banknote in the form of a transaction of an amount to be paid from the blockchain address of the banknote to a blockchain address of a payee, wherein the payment request specifies the amount to be paid and the blockchain address of the payee.

Receiving a signed transaction approval with the private cryptographic key of the banknote, wherein the transaction approval comprises the blockchain address of the banknote, the blockchain address of the payee, and the amount to be paid, Forwarding the signed transaction approval of the banknote to a blockchain server of the blockchain to verify and enter the transaction into the blockchain, Upon a successful verification of the signed transaction approval, receiving a first transaction confirmation.

According to embodiments, an additional transaction-specific value is received together with the signed transaction approval. For example, the additional transaction-specific value is included with the signature of the transaction approval and/or is appended to the signed transaction approval. The additional transaction-specific value is, for example, a timestamp and/or a random number.

According to embodiments, the banknote comprises, for example, a visual indication of a serial number uniquely identifying the banknote. According to embodiments, the banknote comprises, for example, a visual indication of an initial nominal value assigned to the banknote.

Embodiments may have the advantage that a cashless payment process is enabled via a terminal. According to embodiments, the banknote used for the payment process is a banknote according to one of the previously described embodiments.

Embodiments may have the advantage that the central bank, in addition to its role as the banknote issuing institution, additionally provides services in the area of payments or payment processing with respect to the banknote and/or the terminal or a payee using the same, and consequently acts as a classic bank or a commercial bank.

A central bank is understood here to be a national or supra-national institution, which has a monopoly right to issue coins and banknotes as legal tender. Furthermore, a central bank may carry out monetary policy tasks. For example, a central bank holds the currency reserve of a currency area, for example, it regulates the amount of money, for example, it influences the creation of money by lending to commercial banks and/or refinances these commercial banks and the state. For example, the central bank issues banknotes and puts them into circulation.

The terminal may be, for example, a terminal of a seller at a point of sale (PoS), i.e., at the location at which a sale is completed. The terminal may further be a terminal which is connected to a user computer system, via which a payment is to be processed with the banknote. For example, this is a payment process via a network, for example, the internet, with respect to a service provider, whether it is a seller or a payment service provider. The terminal might likewise be provided in the form of a mobile portable communication device, for example, a smartphone of a user. The user might use, for example, the mobile portable communication device for a payment process via a network, for example, the internet, with respect to a service provider, whether it is a seller or a payment service provider.

According to embodiments, the verification of the signed transaction approval comprises a verification of the signature of the transaction approval and also a verification of whether current nominal value of the banknote assigned to the blockchain address of the banknote is greater than or equal to the amount to be paid. Embodiments may have the advantage that an effective verification may be carried out. For example, the transaction may already be confirmed by an entry of the transaction into the blockchain. This may be the case, for example, in the case that it is ensured that no additional previous transactions from the blockchain address of the banknote are queued up for entry into the blockchain, and/or the confirmation is carried out with the proviso that additional previous transactions from the blockchain address of the banknote may possibly be queued up for entry into the blockchain.

According to embodiments, the first transaction confirmation is a provisional transaction confirmation, in which the verification of the current nominal value of the banknote is carried out using a registry, which is updated at regular intervals, and which respectively comprises a current nominal value for the blockchain addresses of the blockchain, which results from the balance sheets of the transactions stored in the blockchain using the corresponding blockchain addresses. The first transaction confirmation is accepted as a sufficient transaction confirmation in the case that the amount to be paid does not exceed a threshold value.

Embodiments may have the advantage that a quick check of the verification of the current nominal value of the banknote may be carried out, without having to first calculate the complete balance sheet of the transactions stored in the blockchain using the corresponding blockchain addresses.

For example, it may also be decided, based on the determined current nominal value, whether a cash payment or a cashless payment is to be carried out with the banknote. If the current nominal value is identical with the amount to be paid, a cash payment is carried out, for example, in which the banknote is transferred to the payee and the ownership of the same transfers to the payee. If the current nominal value is greater than the amount to be paid, a cashless payment is carried out, for example, in which a corresponding payment request is sent to the banknote for a payment in the form of a transaction of an amount to be paid from the blockchain address of the banknote to a blockchain address of a payee. The banknote may authorize this transaction with a signed transaction approval.

If the current nominal value is greater than the amount to be paid, it would likewise be possible that a cash payment is carried out, and the excess amount is reimbursed by the payee as change, for example, in the form of cash.

For example, the nominal value of the banknote may also comprise a guaranteed minimum nominal value and a variable additional nominal value percentage. The minimum nominal value may be paid, for example, only in the form of a cash payment with the transfer of the banknote, while the variable additional nominal value percentage may be used in the context of a cash-based or cashless payment process. In other words, only cashless payments, in which the remaining nominal value of the banknote is greater than or equal to to minimum nominal value, may be carried out with the banknote. If an amount is to be paid with the banknote, which would result in a remaining nominal value, which would be less than the minimum nominal value, a cashless payment is blocked, for example, via the blockchain. Consequently, a cash-based payment must be carried out, for example, in which the banknote is transferred. If the current nominal value of the banknote is greater than the amount to be paid, the remaining difference amount may be refunded by the payee, for example, in the form of change.

For example, the registry used for the provisional transaction confirmation further comprises an indication of the minimum nominal value of the banknote with the corresponding blockchain address.

According to embodiments, the first transaction confirmation is not accepted as sufficient in the case that the amount to be paid exceeds a threshold value. A second transaction confirmation is received, which effects an entry of the transaction into the blockchain, which is accepted as sufficient. Embodiments may have the advantage that it may be safely assumed that the transaction was successful if the transaction was actually entered into the blockchain.

According to embodiments, the public cryptographic key is further received. For example, the public cryptographic key is received prior to sending the payment request. For example, the public cryptographic key, as the visual indication provided by the banknote, is scanned or read. For example, the public cryptographic key is received from the banknote in response to a request sent to the banknote. Embodiments may have the advantage that the public cryptographic key may be used by the terminal to derive the blockchain address of the banknote. The derived blockchain address of the banknote or the public cryptographic key may be sent as components of the payment request to the banknote. For example, the payment request may comprise the complete transaction information, which needs only to still be signed by the banknote to generate the signed transaction confirmation.

According to embodiments, receiving the public cryptographic key comprises reading the visual indication of the public cryptographic key using a sensor of the terminal. For example, the visual indication comprises and alphanumeric character string, a bar code, or a QR code of the public cryptographic key. According to embodiments, receiving the public cryptographic key comprises receiving the public cryptographic key sent using the communication interface of the banknote using the communication interface of the terminal.

According to embodiments, the payment processing method further comprises deriving the blockchain address of the banknote from the public cryptographic key of the banknote. The payment request comprises, for example, the complete transaction information with the blockchain address, which the banknote signs as the transaction approval, derived from the public cryptographic key of the banknote According to embodiments, the banknote comprises a plurality of security features. For example, the method comprises a successful detecting and validation or one or more predefined security features of the plurality of security features of the banknote as a prerequisite for sending the payment request. For example, the method comprises the successful detecting and validation or one or more predefined security features of the plurality of security features of the banknote as a prerequisite for forwarding the signed transaction approval of the banknote. Embodiments may have the advantage that the authenticity and validity of the banknote may be verified by way of the security features.

According to embodiments, the method comprises, as a prerequisite for sending the payment request:
   Detecting an identifier, which uniquely identifies the blockchain address of the banknote, wherein the detected identifier is one of the following indications: the serial number of the banknote, the public cryptographic key of the banknote, the blockchain address of the banknote,
   Sending a blockchain query for the current nominal value of the blockchain address of the banknote,
   Receiving the current nominal value of the blockchain address of the banknote,
   Verifying whether the received current nominal value is greater than or equal to the amount to be paid, wherein sending the payment request to the banknote is carried out upon a successful verification.

Embodiments may have the advantage that it may be ensured that the current nominal value assigned to the banknote is greater than or equal to the amount to be paid. In other words, it may be ensured that the banknote actually includes a sufficient value to pay the amount to be paid.

According to embodiments, the detection of the identifier comprises reading a visual indication, comprised by the banknote, of the identifier using a sensor of the terminal. The sensor is, for example, an optical sensor. According to embodiments, the detection of the identifier comprises receiving the identifier sent using the communication interface of the banknote using the communication interface of the terminal. For example, the identifier is stored in the memory of the security element.

According to embodiments, the received current nominal value of the banknote is a nominal value of blockchain address of the banknote read from the registry. The registry is updated at regular intervals and respectively comprises a current nominal value for the blockchain addresses of the blockchain, which results from the balance sheets of the transactions stored in the blockchain using the corresponding blockchain addresses. According to embodiments, the received current nominal value of the banknote is a nominal value of blockchain address of the banknote read from the blockchain. The read current nominal value of the banknote thereby results, for example, from the balance sheet of the transactions stored in the blockchain involving the blockchain address of the banknote.

Embodiments may have the advantage that a current nominal value may be determined in an efficient way. For example, the complete balance sheet of the transactions stored in the blockchain using the corresponding blockchain addresses does not need to be first calculated for this.

According to embodiments, a plurality of banknotes is received. The identifiers of the blockchain addresses of the banknotes are detected, for example, serial numbers, public cryptographic keys, and/or the blockchain addresses themselves, and for each of the banknotes, a current nominal value is respectively determined using a blockchain query for the banknotes according to the assigned blockchain address. A set of banknotes is selected from the plurality of received banknotes and retained, whose summed current nominal value yields an amount which is less than an amount to be paid. The remaining difference amount between the amount to be paid and the summed amount of the set of selected banknotes is less than a current nominal value of an additional banknote from the plurality of banknotes, which is not included in the set of selected banknotes. The payment request for paying the difference amount is sent to the additional banknote.

Embodiments may have the advantage that a combination of cash-based and cashless payment might be enabled. For the retained set of banknotes, there results no necessity for transaction authorizations and/or entries of corresponding transactions into the blockchain. The payment with these banknotes is carried out instead by transferring the banknotes, as is common for cash payments. In the case that the amount to be paid does not add up, i.e., the sum of the nominal values of the banknotes of the retained set of banknotes is less than the amount to be paid and no further banknote is present, whose nominal value corresponds to the remaining difference amount, the payment of the remaining difference amount is carried out cashlessly using an additional banknote, whose nominal value is greater than the corresponding difference value. Alternatively, the payment of the remaining difference amount may also be carried out by retaining the additional banknote and the excess amount paid is refunded. For example, by a transaction from a blockchain address of the payee to a blockchain address of a non-retained banknote, which remains in the ownership of the payer. According to embodiments, all non-retained banknotes are returned.

According to embodiments, the banknotes of the plurality of banknotes each comprise a plurality of security features. The method comprises, for example, a respective validity check for each of the banknotes. The validity check of the banknotes comprises, for example, a successful detection and validation in each case of one or more predefined security features of the plurality of security features of the corresponding banknote. Embodiments may have the advantage that the authenticity and validity of all banknotes may be ensured, in particular of the retained banknotes.

Embodiments comprise a method for determining a current nominal value of a banknote using a terminal. The banknote comprises a communication interface for communicating with the terminal and a security element with a processor and a memory. A banknote-specific private cryptographic key of an asymmetric key pair of the banknote is stored in a protected memory area of the memory. The asymmetric key pair is assigned to a banknote-specific blockchain address of a blockchain managed by a central bank issuing the banknote. The terminal comprises a processor, a memory, and a communication interface for communicating with the banknote.

The determination of the current nominal value by the terminal comprises:

Detecting an identifier, which uniquely identifies the blockchain address of the banknote, wherein the detected identifier is one of the following indications: the serial number of the banknote, the public cryptographic key of the banknote, the blockchain address of the banknote, Sending a blockchain query for the current nominal value of the blockchain address of the banknote, Receiving the current nominal value of the blockchain address of the banknote.

According to embodiments, the banknote comprises, for example, a visual indication of a serial number uniquely identifying the banknote. According to embodiments, the banknote comprises, for example, a visual indication of an initial nominal value assigned to the banknote.

Embodiments may have the advantage that the terminal may determine the current nominal value of the banknote by way of the identifier, for example, the serial number, the public cryptographic key, or the blockchain address itself. For this purpose, the banknote comprises, for example, visual indications of the corresponding identifier and/or reads the same from the security element. Using the serial number may have the advantage that the serial number may be present independently from a generation of the public cryptographic key of the banknote and thus of the blockchain address of the banknote. Thus, the serial number may be printed on the banknote and/or otherwise incorporated into the banknote before the asymmetric cryptographic key pair of the banknote is generated. This enables it to first conclude the production of the banknote and subsequently generate the asymmetric cryptographic key pair of the banknote. Otherwise, the asymmetric cryptographic key pair of the banknote is generated by the security element, for example, before or at the beginning of the production of the banknote and the public cryptographic key and/or the blockchain address derived therefrom is provided for using for the production of the banknote. For example, the public cryptographic key is output by the security element before or at the beginning of the production of the banknote. The output public cryptographic key is assigned, for example, to the serial number of the banknote to be produced, by which means the security model of the serial number is assigned to the banknote to be produced.

According to embodiments, the detection of the identifier comprises reading a visual indication of the identifier using a sensor of the terminal. According to embodiments, the detection of the identifier comprises receiving the identifier sent using the communication interface of the banknote using the communication interface of the terminal.

For example, the detection of the current nominal value is carried out in the context of a cash-based payment process with the transfer of the corresponding banknote, in order to determine the actual value and thus the actual cash-based monetary amount transferred.

According to embodiments, the received current nominal value of the banknote is a nominal value of blockchain address of the banknote read from the registry. The registry is updated at regular intervals, and respectively comprises a current nominal value for the blockchain addresses of the blockchain, which results from the balance sheets of the transactions stored in the blockchain using the corresponding blockchain addresses. According to embodiments, the received current nominal value of the banknote is a nominal value of blockchain address of the banknote read from the blockchain. The read current nominal value of the banknote thereby results, for example, from the balance sheet of the transactions stored in the blockchain involving the blockchain address of the banknote.

According to embodiments, the banknote is a banknote, whose current nominal value is determined according to one of the previously described embodiments.

Embodiments comprise a method for replacing a banknote. The banknote comprises a visual indication of a serial number uniquely identifying the banknote and an initial nominal value assigned to the banknote. The banknote comprises the visual indication of the serial number distributed multiple times across the banknote. The banknote comprises a plurality of security features arranged distributed across the banknote: the banknote comprises a security element with a processor and a memory with program instructions. A banknote-specific private cryptographic key of an asymmetric key pair of the banknote is stored in a protected memory area of the memory. The asymmetric key pair is assigned to a banknote-specific blockchain address in a blockchain managed by a central bank issuing the banknote. Furthermore, the banknote has damage.

Replacing the banknote by the central bank issuing the damaged banknote comprises:

Verifying a degree of damage to the banknote,
In the case that the degree of damage to the banknote exceeds a predefined maximum permissible degree of damage, detecting an identifier, which uniquely identifies the blockchain address of the damaged banknote, wherein the detected identifier is one of the following indications: the serial number of the damaged banknote, the public cryptographic key of the damaged banknote, the blockchain address of the damaged banknote,
Initializing a blocking of the blockchain address of the banknote using the detected identifier,
Sending a blockchain query for the current nominal value of the blockchain address of the damaged banknote,
Receiving the current nominal value of the blockchain address of the damaged banknote,
Paying out the current nominal value of the damaged banknote.

Embodiments may have the advantage that, in the case of damage, the actual nominal value of the banknote may be replaced. This actual nominal value may deviate significantly from the initial nominal value of the banknote and/or from a minimum nominal value of the banknote. According to embodiments, it is necessary that the degree of damage to the banknote does not exceed a predefined maximum permissible degree of damage, that more than 50% of the banknote is present and/or the banknote comprises one or more valid security features necessary for a replacement.

According to embodiments, the banknote to be replaced is a banknote according to one of the previously described embodiments. According to embodiments, the damaged banknote is retained.

According to embodiments, the payment of the current nominal value of the damaged banknote comprises providing one or more banknotes as a replacement, whose current nominal values correspond in sum to the current nominal value of the damaged banknote. According to embodiments, the one or more banknotes as a replacement are banknotes according to one of the previously described embodiments. According to embodiments, the payment of the current nominal value of the damaged banknote comprises an entry of a transaction of an amount at the level of the current nominal value by a blockchain address of the central bank issuing the damaged banknote to a blockchain address specified by an owner of the damaged banknote. For example, the specified blockchain address is assigned to another banknote of the owner, i.e., the possessor, of damaged the banknotes, the owner of the damaged banknote personally, or another institution selected by the owner of the damaged banknotes.

According to embodiments, the damage comprises damage to the security element, so that the security element may no longer provided signed transaction approvals. For example, the processor, the memory, and/or a communication interface of the security element is/are damaged. For example, the security element is missing.

According to embodiments, the plurality of indications of the identifier is distributed across the banknote in such a way that it may be ensured that the identifier and thus the blockchain address of the banknote may be determined as long as more than 50% of the banknote is present. According to embodiments, the plurality of security elements is distributed across the banknote in such a way, that it may be ensured that valid security features, necessary for a replacement, are present as long as more than 50% of the banknote is present undamaged.

According to embodiments, replacing the banknote by the central bank issuing the damaged banknote further comprises a block entry into the blockchain by the central bank managing the blockchain and issuing the banknote. The corresponding blockchain address is blocked by the block entry. The block entry indicates, for example, that the blockchain address of the banknote is invalid. In the case of a block entry for the blockchain address of the banknote by the central bank, it may be ensured, for example, that no money may be transferred from the invalid blockchain address to another blockchain address, i.e., that no payments may be sent, and/or that no money may be transferred from another blockchain address to the invalid blockchain address, i.e., that no payments may be received.

Embodiments might have the advantage that, when replacing the banknote, the processor and/or the security element of the damaged banknote are not retained and, after payment of the (final) current nominal value of the damaged banknote, further payments may be made using them, i.e., signed transaction confirmations may be issued. Furthermore, it may be prevented, for example, that payments are inadvertently carried out to the blockchain addresses of the damaged banknote, after the (final) current nominal value was already paid and the damaged banknote was retained. In this case, there would be, for example, no longer a possibility of accessing the inadvertently transferred money.

For example, for a transaction from a blockchain address of a banknote, it is verified, as a prerequisite for executing the transaction, whether the corresponding blockchain address is blocked. In the case that the blockchain address is not blocked, the transaction is executed, i.e., entered into the blockchain. In the case that the blockchain address is blocked, the transaction is not executed, i.e., not entered into the blockchain.

For example, for a transaction to a blockchain address of a banknote, it is verified, as a prerequisite for executing the transaction, whether the corresponding blockchain address is blocked. In the case that the blockchain address is not blocked, the transaction is executed, i.e., entered into the blockchain. In the case that the blockchain address is blocked, the transaction is not executed, i.e., not entered into the blockchain.

Figure 2A:
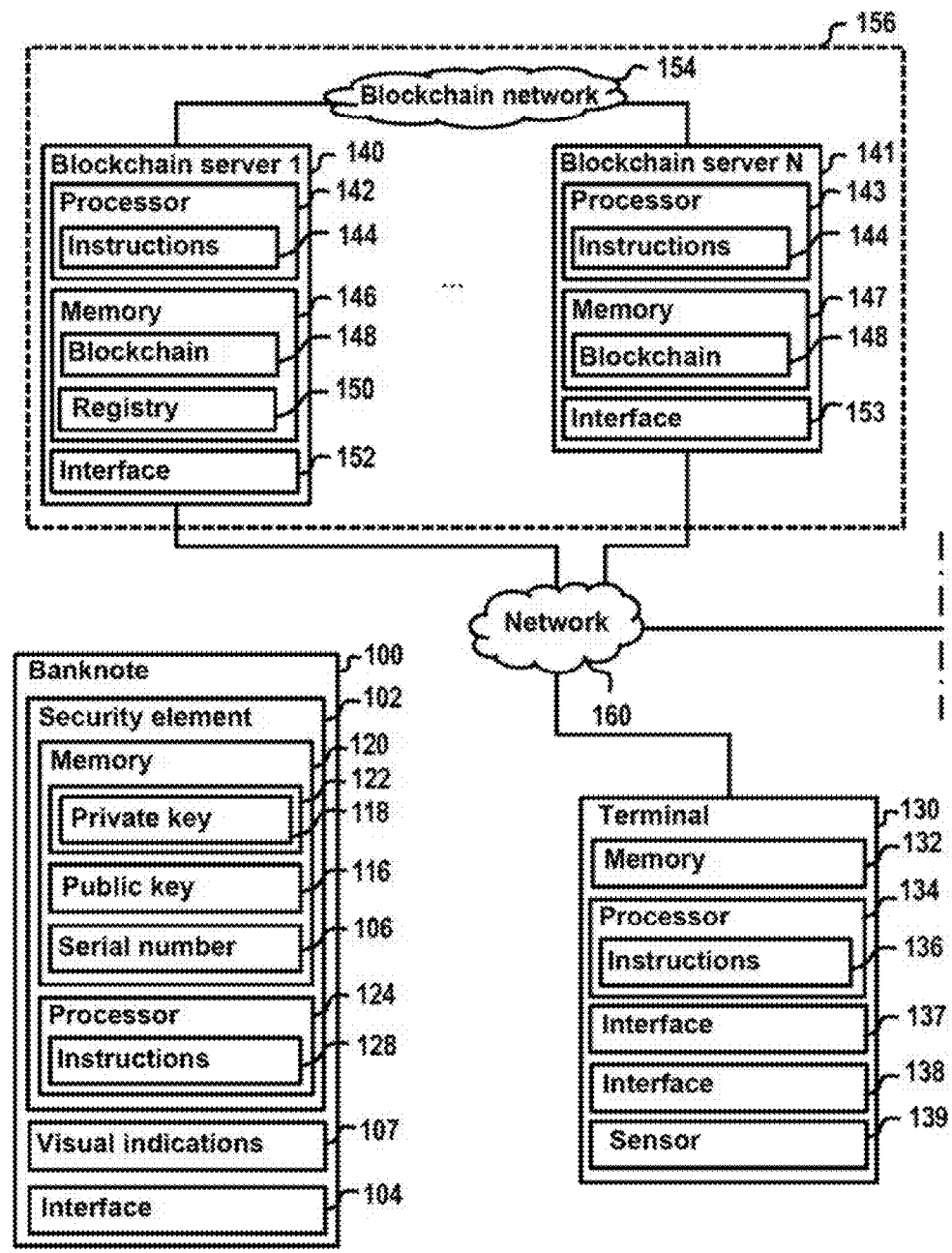
Figure 2B:
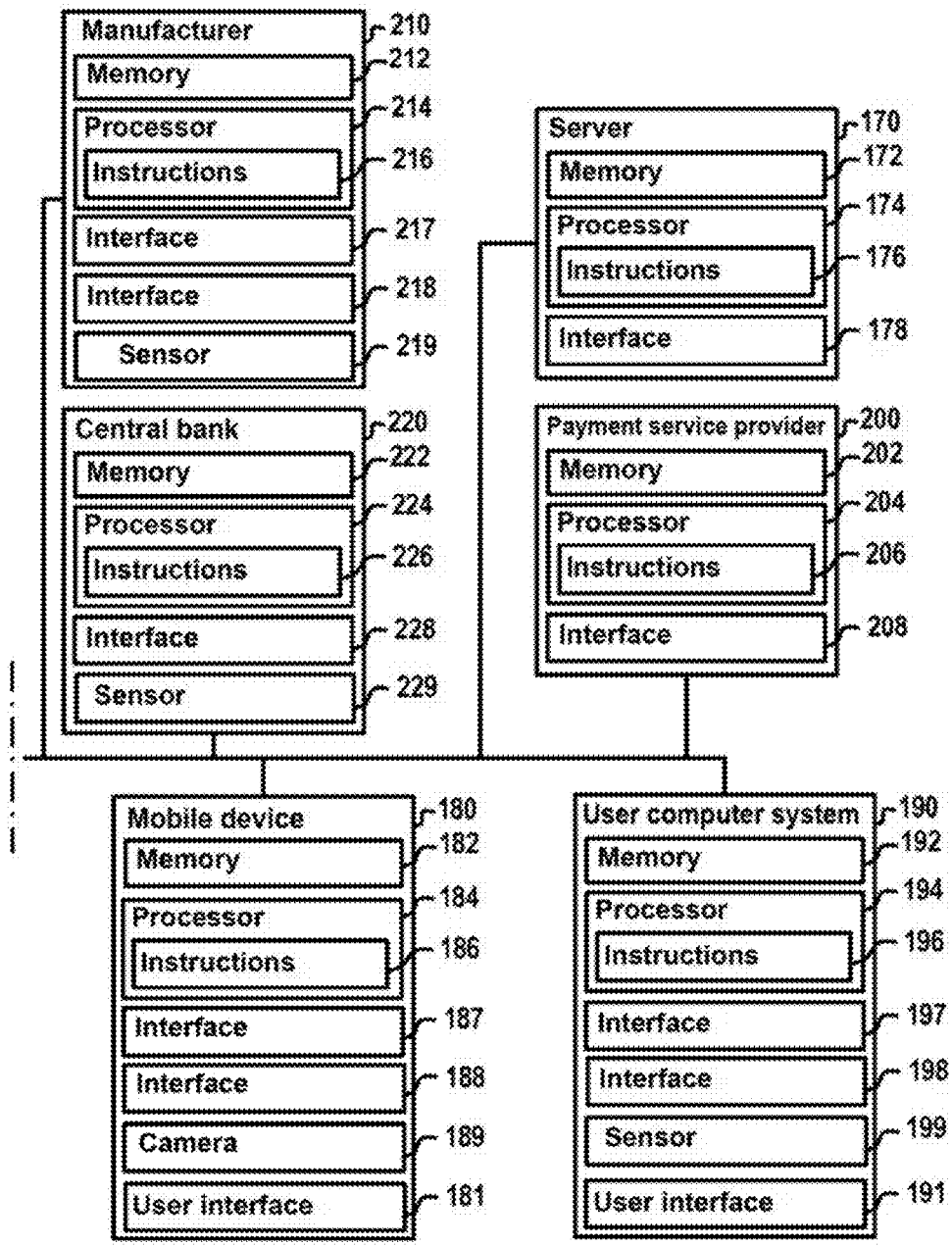
Figure 3:
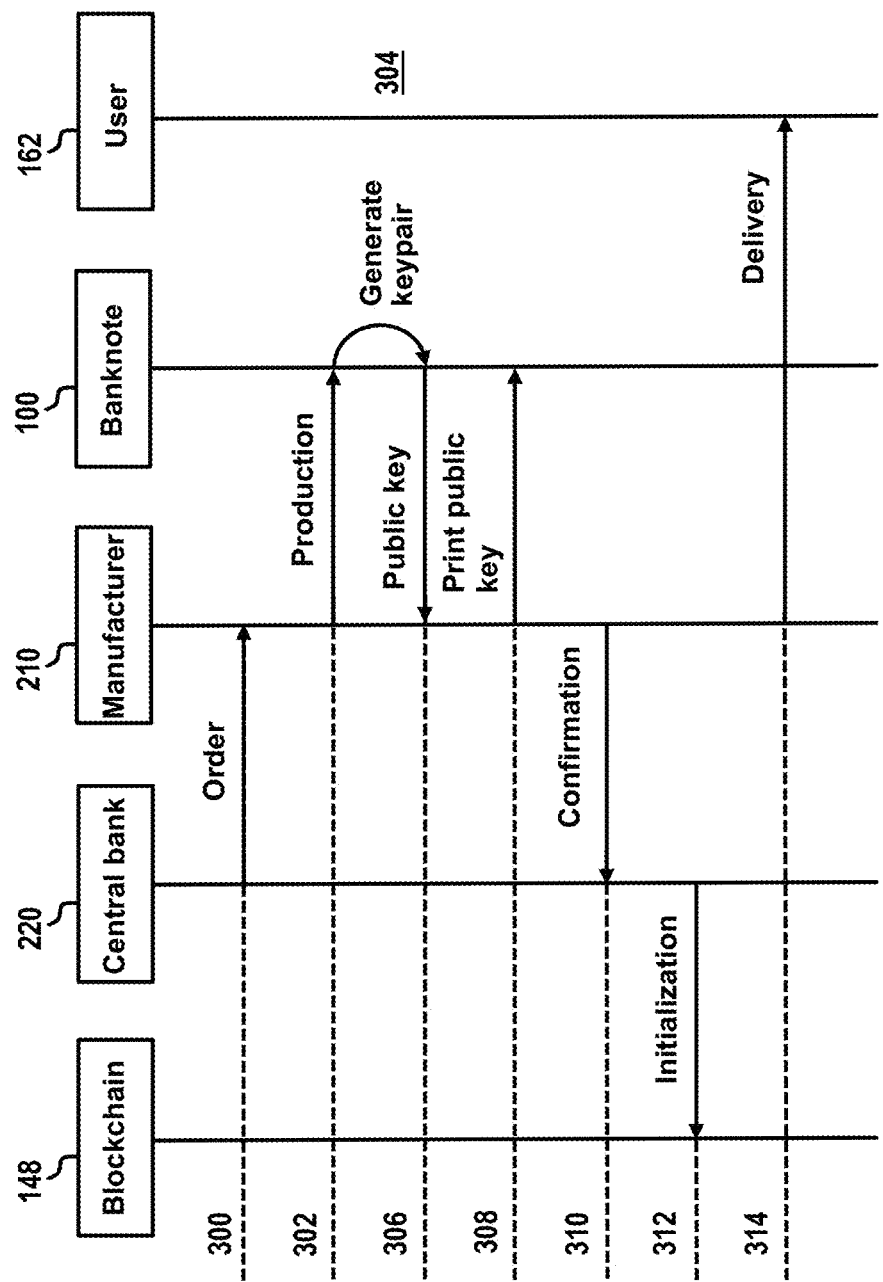
Figure 4:
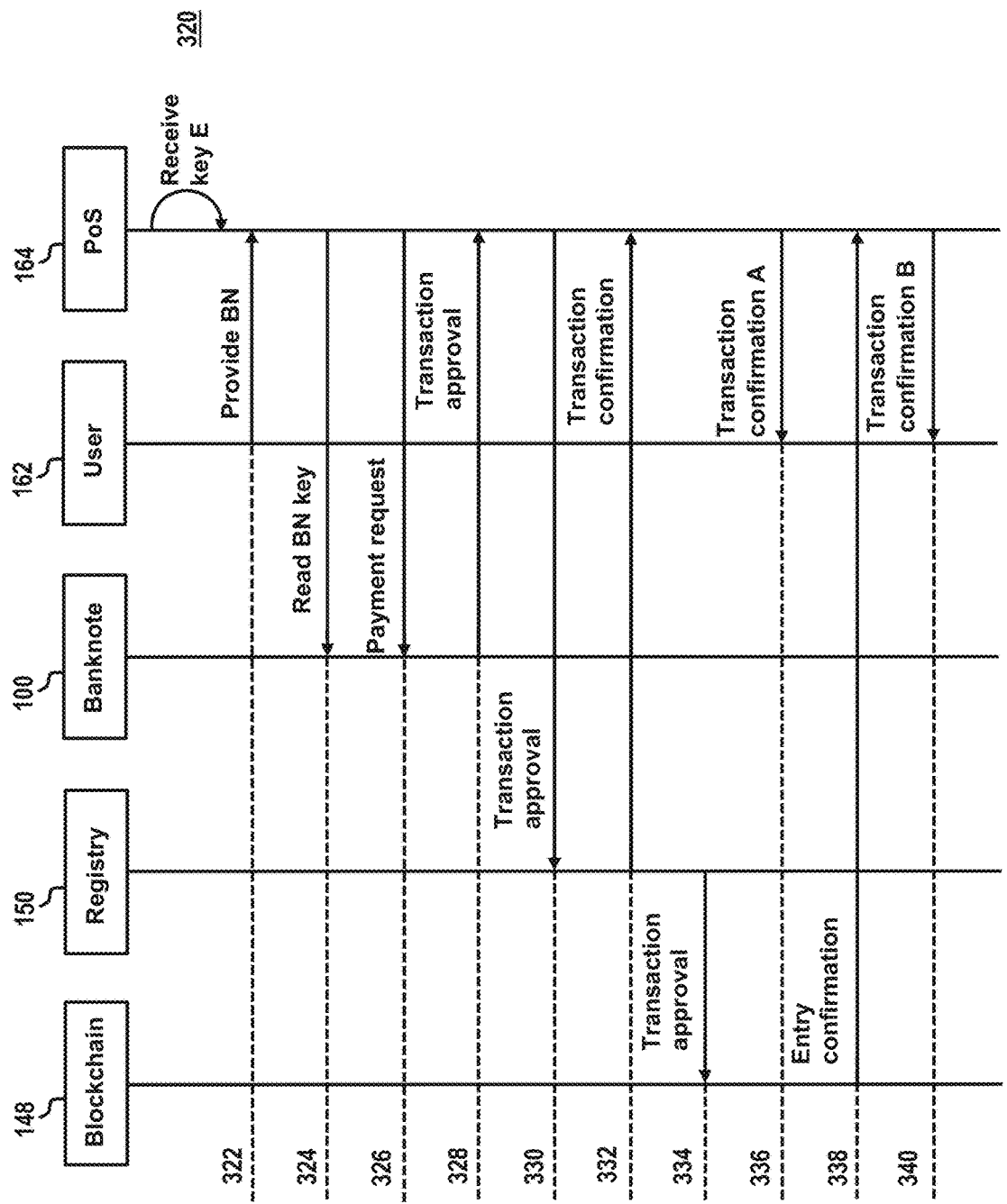
Figure 5:
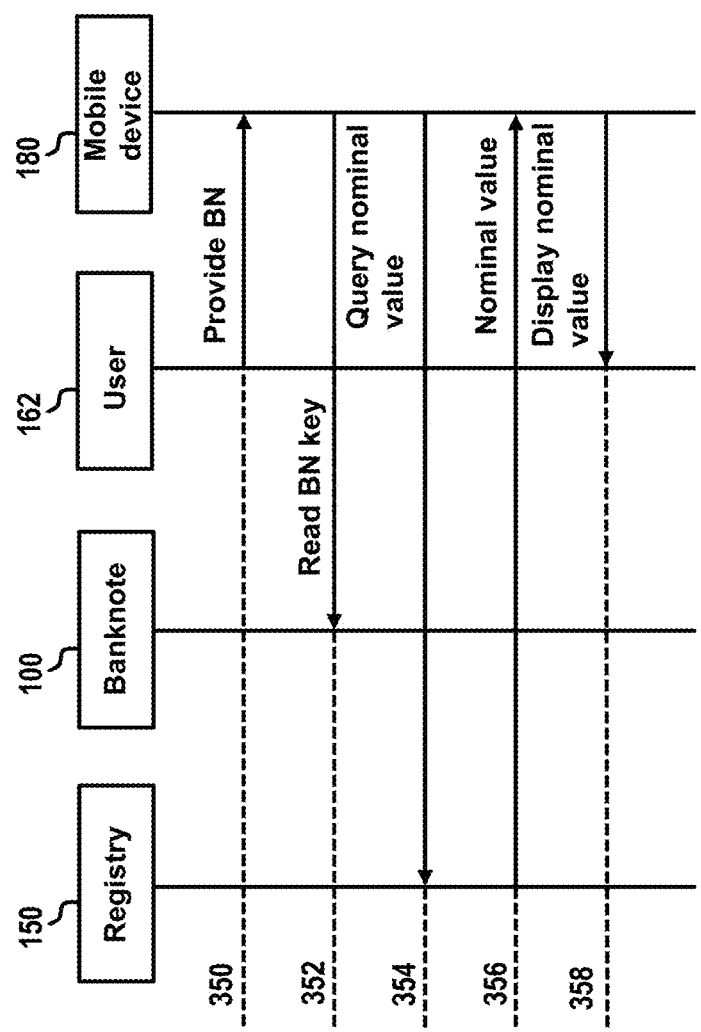
Figure 6A:
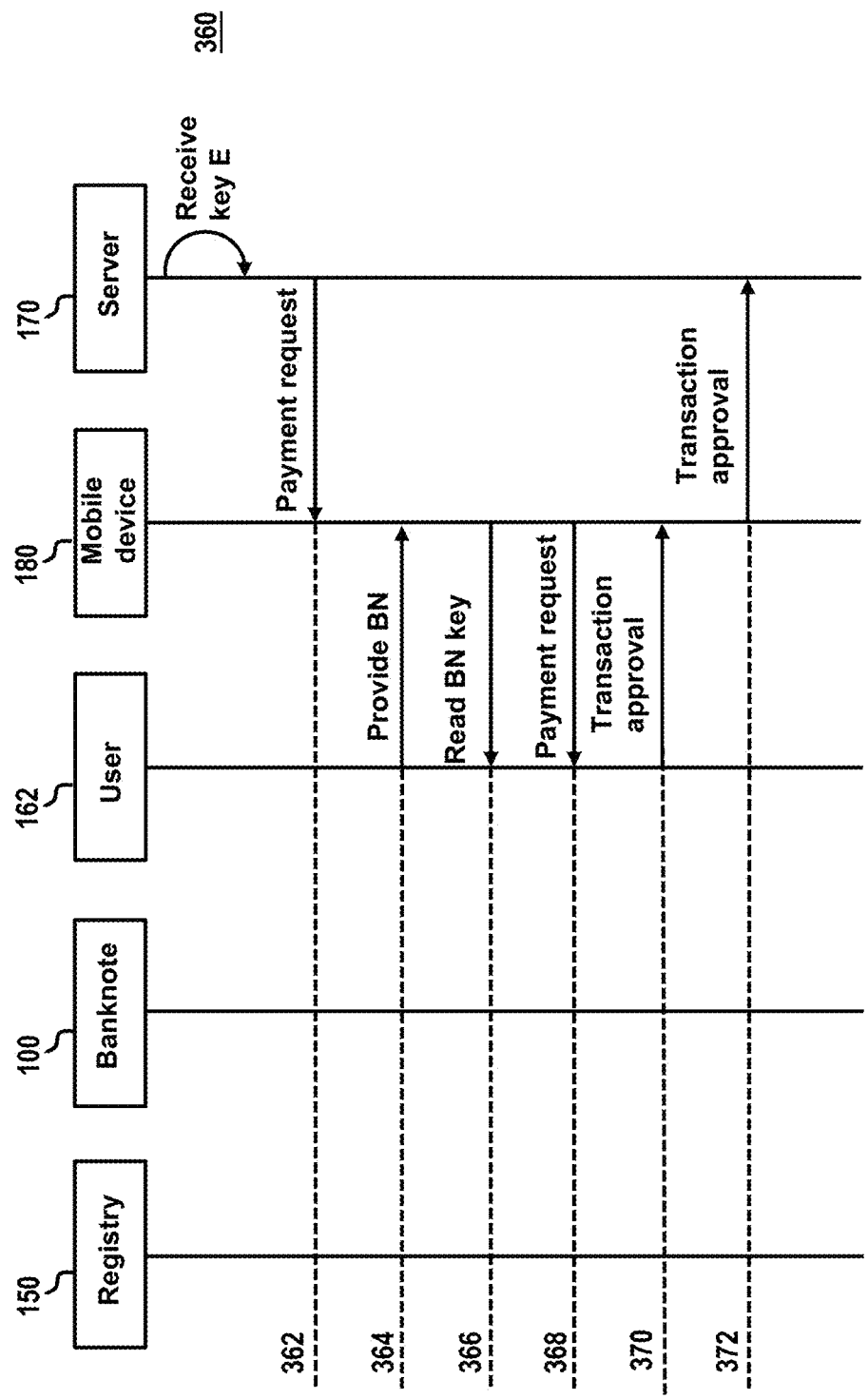
Figure 6B:
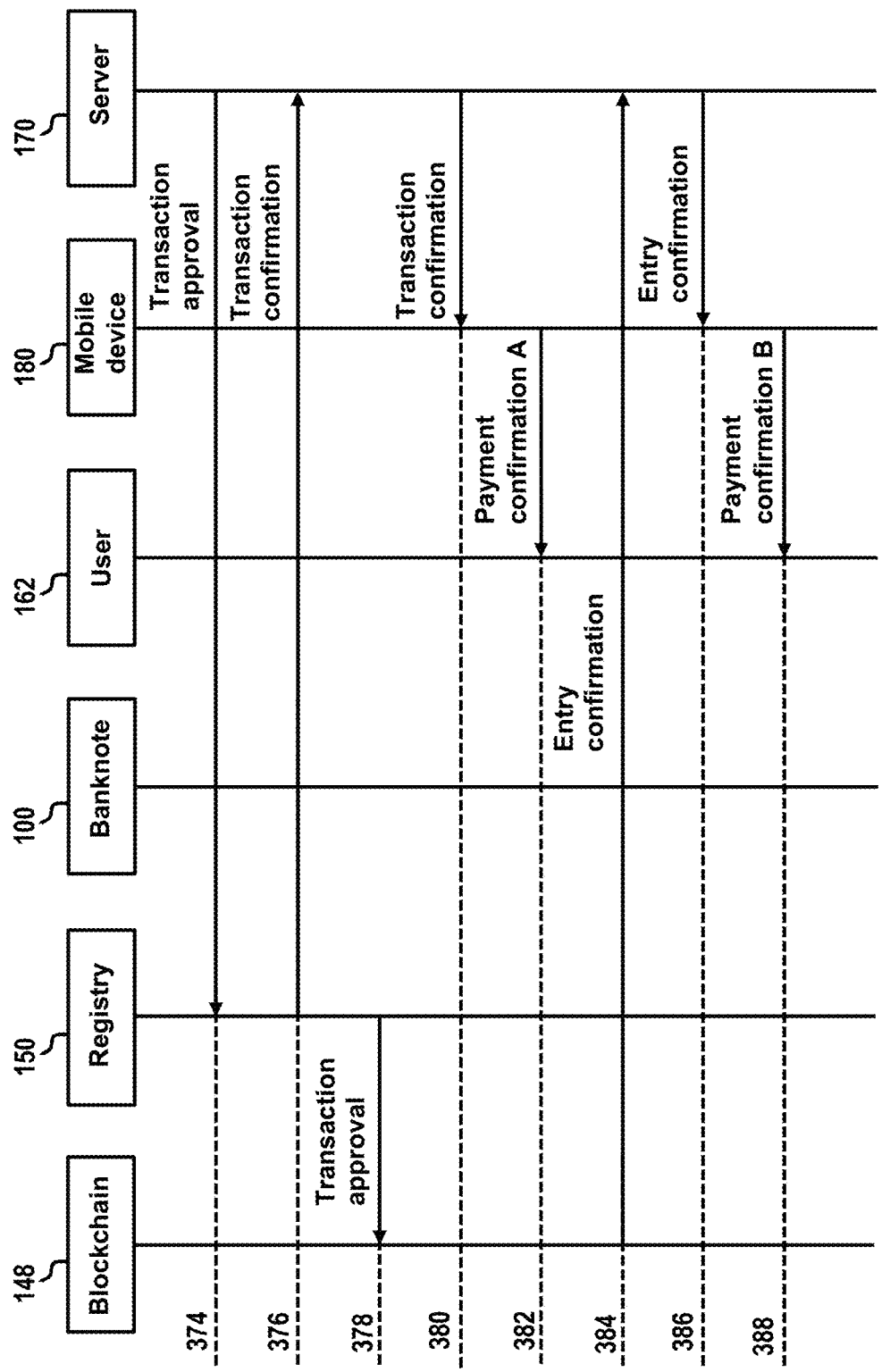
Figure 7:
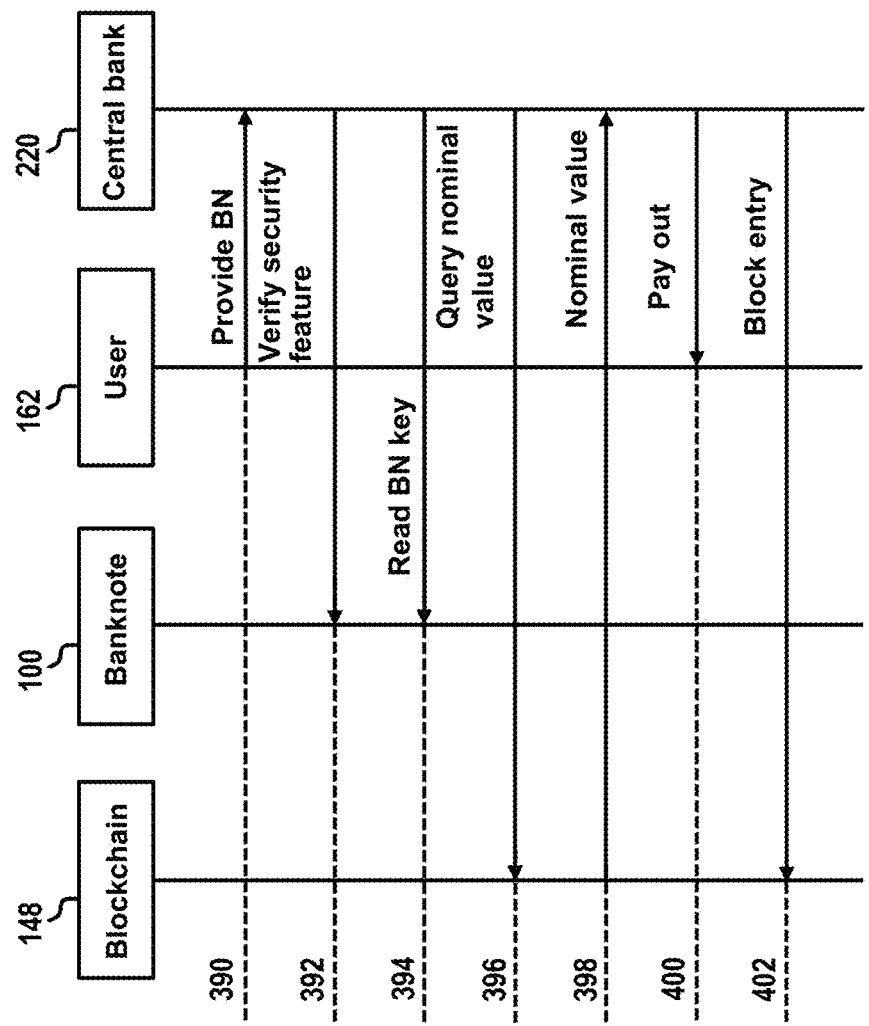
Figure 8:
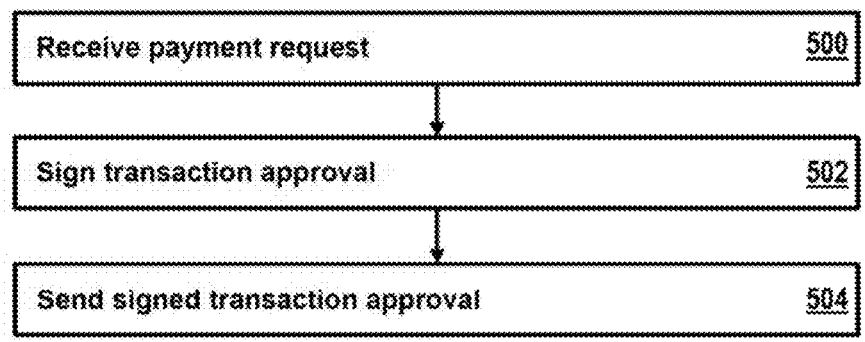
Figure 9:
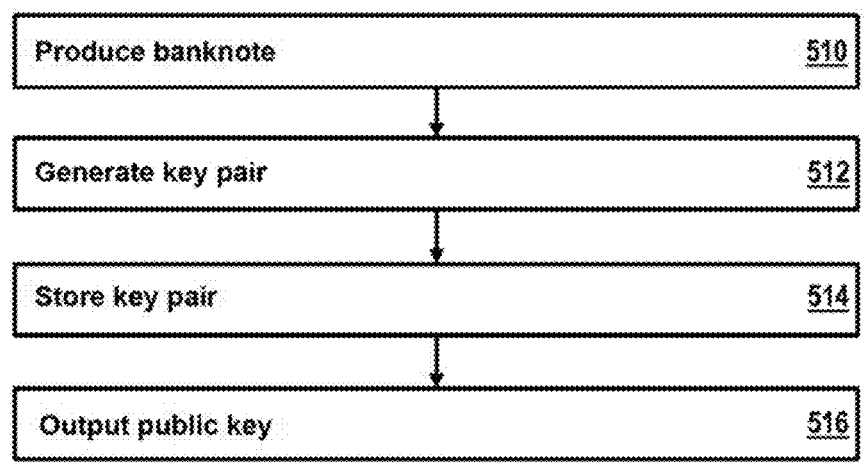
Figure 10:
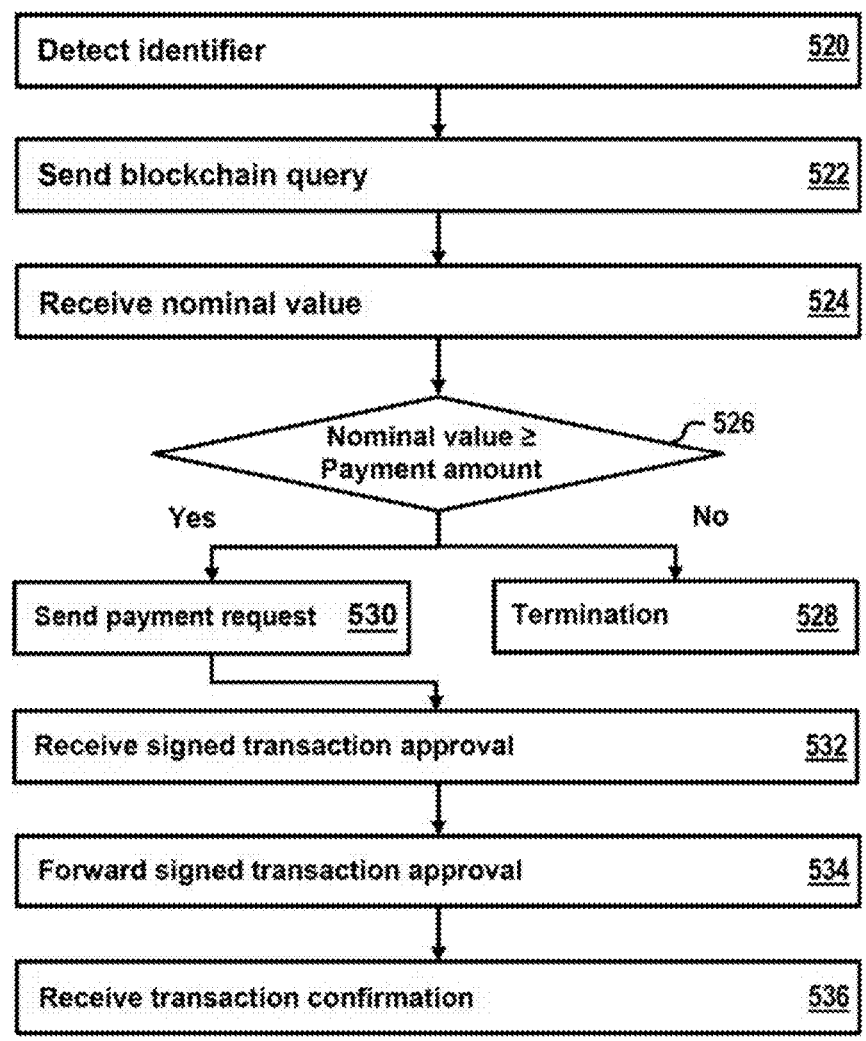
Figure 11:
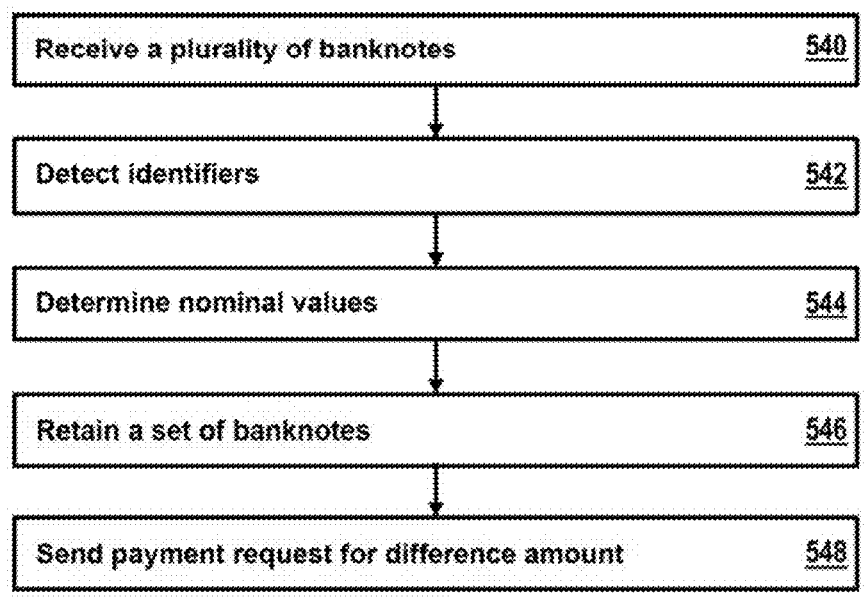
Figure 12:
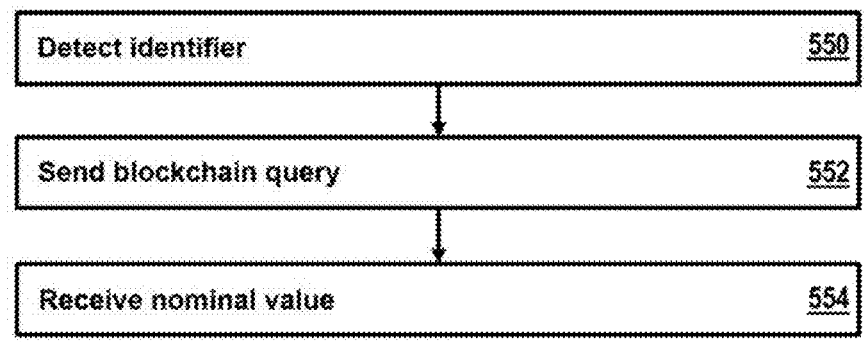
Figure 13:
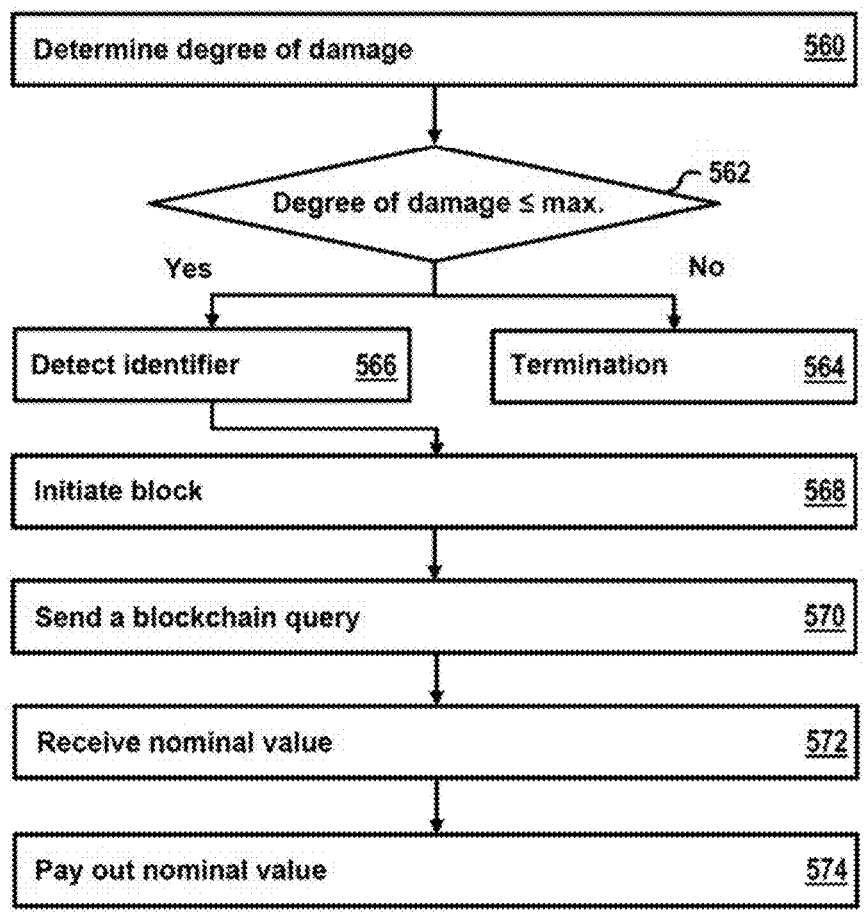

Embodiments of the invention are elucidated in greater detail below with reference to the drawings. As shown in:

FIGS. 1A to 1D schematic block diagrams of exemplary banknotes,

FIGS. 2A and 2B a schematic block diagram of an exemplary system with an exemplary banknote, FIG. 3 a schematic flow diagram of an exemplary method for issuing banknotes, FIG. 4 a schematic flow diagram of an exemplary method for processing payments with a terminal, FIG. 5 a schematic flow diagram of an exemplary method for determining a current nominal value, FIGS. 6A and 6B schematic flow diagram of an exemplary method for processing payments with a mobile portable communication device, FIG. 7 a schematic flow diagram of an exemplary method for replacing a banknote, FIG. 8 a schematic flow diagram of an exemplary method for using a banknote, FIG. 9 a schematic flow diagram of an exemplary method for issuing a banknote, FIG. 10 a schematic flow diagram of an exemplary method for processing payments with a terminal, FIG. 11 a schematic flow diagram of an exemplary method for processing payments with a plurality of banknotes, FIG. 12 a schematic flow diagram of an exemplary method for determining a current nominal value, and FIG. 13 a schematic flow diagram of an exemplary method for replacing a banknote.

Elements of the subsequent embodiments, which correspond with one another, are designated with the same reference numerals.

FIGS. 1A to 1D show exemplary banknotes 100. Banknote 100, shown in FIG. 1A, comprises a plurality of security features 110 which prove the authenticity and validity of banknote 100. Security features 110 are arranged distributed across banknote 100. For example, security features 110 are arranged distributed across banknote 100 such that, as long as more than 50% of the banknote is present in an undamaged state, the authenticity and validity of banknote 100 may be proven. Banknote 100 further comprises a visual indication of serial number 106 of banknote 100, which is printed, for example, on banknote 100. For example, banknote 100 comprises a plurality of visual indications of serial number 106, which are arranged distributed across banknote 100, for example in microprinting. For example, serial number 106 is arranged distributed across banknote 100 such that, as long as more than 50% of the banknote is present in an undamaged state, serial number 106 of banknote 100 may be determined. Serial number 106 of banknote 100 is, for example, a public cryptographic key, from which the blockchain address of banknote 100 is derivable, and/or is assigned to a blockchain address of banknote 100. Thus, using serial number 106 of banknote 100, for example, a public cryptographic key may be determined, from which the blockchain address of banknote 100 is derivable, and/or of a blockchain address of banknote 100.

The banknote further comprises one or more visual indications of an initial nominal value 108 of banknote 100. Initial nominal value 108 is, for example, a minimum nominal value of banknote 100. For example, banknote 100 comprises one or more visual indications of a minimum nominal value differing from the initial nominal value 108 in addition to the indication of initial nominal value 108. For example, banknote 100 comprises one or more visual indications of the minimum nominal value instead of visual indications of an initial nominal value 108 differing from the minimum nominal value. The banknote additionally comprises a security element 102 with a processor and a memory. A private cryptographic key for signing transaction approvals, i.e., for authorizing transactions from a blockchain address assigned to banknote 100, is stored In a protected memory area of the memory. Banknote 100 further comprises a communication interface 104 for communicating with a terminal, in particular for contactless communication. Banknote 100 receives, for example, payment requests and sends, for example, signed transaction approvals via communication interface 104.

Figure 1B:
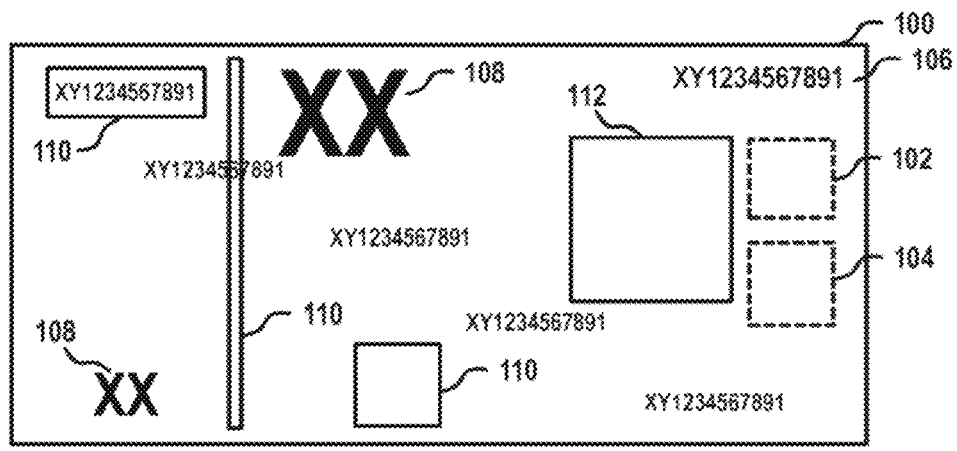

FIG. 1B shows an exemplary banknote 100 which corresponds to exemplary banknote 100 from FIG. 1A. In addition, banknote 100 in FIG. 1B comprises a user interface 112.

User interface 112 comprises, for example, an input and/or output device of banknote 100. For example, user interface 112 comprises a touchpad to input data, for example, transaction data, into banknote 100 and/or a display for displaying data, for example, transaction data, which banknote 100 is to process or has processed. For example, user interface 112 comprises a touch display, with which data may both be input by the user, and data may also be displayed to the user.

Figure 1C:
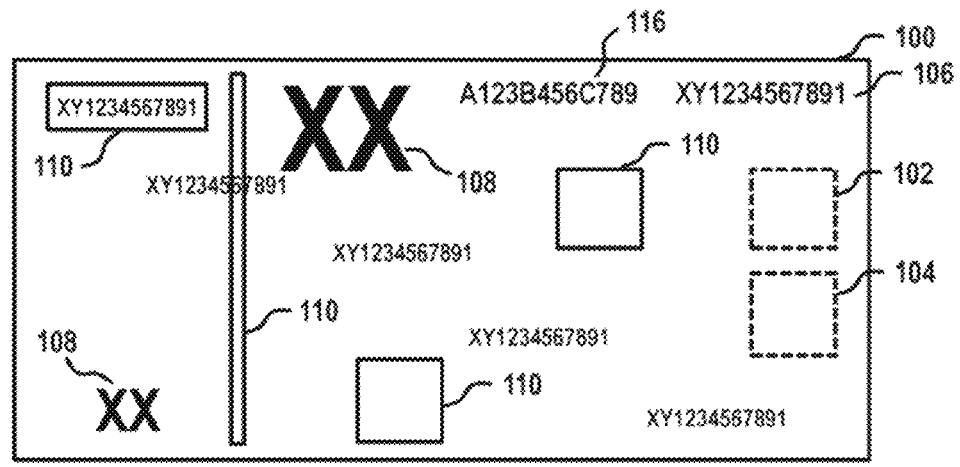
Figure 1D:
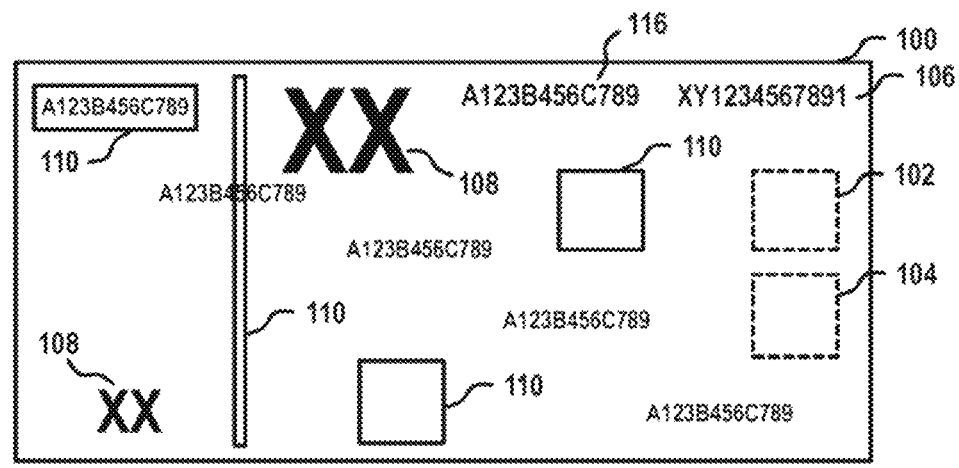

FIG. 1C shows an exemplary banknote 100 which corresponds to exemplary banknote 100 from FIG. 1A. In addition, banknote 100 in FIG. 1C comprises, in addition to the visual indication of serial number 106, a visual indication which identifies the blockchain address of banknote 100. The additional indication is, for example, a public cryptographic key 116, from which the blockchain address of banknote 100 is derivable, and/or is the blockchain address of banknote 100. FIG. 1D shows an exemplary banknote 100 which corresponds to exemplary banknote 100 from FIG. 1C. In the case of the banknote in FIG. 1D, banknote 100 comprises a plurality of additional visual indications, which identify a blockchain address of banknote 100, for example, public cryptographic key 116. These additional visual indications are, for example, arranged distributed across banknote 100, for example, in microprinting. For example, the additional visual indications are arranged distributed across banknote 100 such that, as long as more than 50% of the banknote is present in an undamaged state, the blockchain address of banknote 100 may be identified.

FIGS. 2A and 2B show an exemplary system with an exemplary banknote 100. Banknote 100 comprises a security element 102 with a processor 124 and a memory 120. Processor 124 executes program instructions 128. These program instructions 128 comprise, for example, cryptographic program instructions for generating an asymmetric key pair 116, 118 of banknote 100 and for signing transaction approvals with a private cryptographic key 118 of the asymmetric key pair. Furthermore, the cryptographic program instructions may be configured, for example, to derive a blockchain address of banknote 100 from public cryptographic key 116. Public cryptographic key 116 of the asymmetric key pair is stored in memory 120. Furthermore, serial number 106 of banknote 100 is stored, for example, in memory 120. Private cryptographic key 118 of the asymmetric key pair is stored in a protected memory area 122 of memory 120. Banknote 100 further comprises, for example, a communication interface 104 for communicating with external devices, for example, with a terminal 130. Communication interface 104 is configured, for example, for contactless communication. In addition, banknote 100 comprises visual indications 107, for example, serial number 106 and/or public cryptographic key 116. Furthermore, banknote 100 may further comprise, for example, a user interface with an input and/or output device for inputting and/or displaying data, for example, transaction data.

Banknote 100 communicates using communication interface 104, for example, with a terminal 130. Terminal 130 is, for example, a payment terminal of a PoS. Terminal 130 comprises a processor 134 for executing program instructions 136 and a memory 132. Terminal 130 further comprises a communication interface 137 for communicating with banknote 100. In addition, terminal 130 comprises a communication interface 139 for communicating via a network 160, for example, the internet. Terminal 130 is configured, for example, for processing payments with banknote 100. For this purpose, terminal 130 sends, for example, a payment request to banknote 100 and receives a signed transaction approval from banknote 100, which terminal 130 sends via network 160 to a blockchain server 140, 141 for entering the transaction, authorized by the signed transaction approval, into blockchain 148. Blockchain server 140, 141 belongs, for example, to a blockchain network 154. The terminal may further comprise, for example, a sensor 139.

Sensor 139 is configured, for example, to detect visual indications 107 of banknote 100, for example, serial number 106 and/or public cryptographic key 116. Furthermore, sensor 139 may be configured, for example, for detecting security features of banknote 100 in order to verify their authenticity and validity. For example, a blockchain address is stored in memory 132, which terminal 130 uses as the receiving address for receiving payments.

Terminal 130 communicates, for example, with blockchain servers 140, 141 via a remote server 170. Server 170 comprises, for example, a memory 172, a processor 174 for executing program instructions 176, and a communication interface 178 for communicating via network 160. For example, server 170 provides the blockchain address to be used as the receiving address to terminal 130. For example, server 170 forwards signed transaction approvals received via terminal 130 to blockchain servers 140, 141. For example, server 170 forwards transaction confirmations and/or entry confirmations received from blockchain servers 140, 141 to terminal 130.

The system further comprises one or more blockchain servers 140, 141. Blockchain servers 140, 141 are, for example, part of a blockchain network 154 or form blockchain nodes of a blockchain network 154. Blockchain servers 140, 141 and/or blockchain network 154 is/are managed, for example, by a central bank issuing the banknote. If the central bank is a central bank, to which several countries are affiliated, blockchain network 154 comprises, for example, one or more blockchain servers 140, 141 per country. For example, blockchain servers 140, 141 and/or blockchain network 154 are encompassed by a central bank system 156. Blockchain server 140 comprises, for example, a memory, a processor 142 for executing program instructions 144, and a communication interface 152 for communicating via network 160. For example, a copy of blockchain 148 and/or a registry 150 is/are stored in memory 146. Registry 150 is, for example, a registry, updated at regular intervals, which comprises a current nominal value for each of the blockchain addresses of blockchain 148. The current nominal values are calculated from the balance sheets of the transactions, stored in blockchain 148, for the corresponding blockchain addresses. Registry 150 provides, for example, a "fast blockchain", in which the pre-calculated balance sheet results for the blockchain addresses are provided as current nominal values of the corresponding blockchain addresses. Using this type of registry may have the advantage that current nominal values may be determined faster, as these are already available and do not need to be calculated first. Registry 150 may be maintained, for example, by a virtual machine (VM) of blockchain server 140.

Blockchain server 140 may be configured to register and/or block banknotes or blockchain addresses of banknotes in blockchain 148 upon request by the central bank. Blockchain server 140 may be configured to provide information, upon request, about current nominal values of banknotes, according to transactions stored in blockchain 148, using the blockchain addresses of the corresponding banknotes. For example, blockchain server 140 uses registry 150 to provide corresponding information. Blockchain network 154 may comprise, for example, one or more additional blockchain servers 141. Additional blockchain servers 141 each comprise, for example, a memory 147, a processor 143 for executing program instructions 145, and a communication interface 153 for communicating via network 160. A copy of blockchain 148 is stored, for example, in memories 147. Blockchain servers 141 may be configured, for example, to register and/or block banknotes or blockchain addresses of banknotes in blockchain 148 upon request by the central bank.

Instead of terminal 130, a mobile portable communication device 180 may also be used for processing payments or a user computer system 190 may be used for processing payments, for example, via the internet. The mobile communication device 180 or the user computer system 190 may thereby function, for example, as a local PoS. For example, the payment process is carried out using remote server 170. For example, the payment process is carried out using a server 200 of a payment service provider or of a financial service provider.

Mobile communication device 180, for example, a smartphone, comprises, for example, a memory 182 and a processor 184 for executing program instructions 186. Mobile communication device 180 further comprises, for example, a communication interface 187 for communicating with banknote 100 and a communication interface 188 for communicating via network 160. For example, mobile communication device 180 comprises a camera for detecting visual indications 107 of banknote 100, for example, serial number 106 or public cryptographic key 116 of banknote 100. Mobile communication device 180 is configured, for example, to forward a payment request, for example, from server 170 of payment processing server 200, to banknote 100 and to forward a transaction approval signed by banknote 100 to server 170 or to payment processing server 200. For example, mobile communication device 180 is further configured to determine the blockchain address of banknote 100 using camera 189 and to supplement the payment request to banknote 100 with the blockchain address as the output address of the payment. Mobile communication device 180 may further be configured to directly determine the current nominal value of banknote 100 according to blockchain 148 or by using a server, like server 170 or payment processing server 200, and to display it to a user by using a user interface 181. User interface 181 comprises, for example, an input and output device for communication by the user with mobile communication device 180. The input device comprises, for example, a keyboard. The output device comprises, for example, a display. For example, the input and output device are combined with one another in the form of a touch display.

User computer system 190 comprises, for example, a memory 192 and a processor 194 for executing program instructions 196. User computer system 190 further comprises, for example, a communication interface 197 for communicating with banknote 100 and a communication interface 198 for communicating via network 160. For example, user computer system 190 comprises a sensor, for example, a camera for detecting visual indications 107 of banknote 100, for example, serial number 106 or public cryptographic key 116 of banknote 100. User computer system 190 is configured, for example, to forward a payment request, for example, from server 170 to payment processing server 200, to banknote 100 and to forward a transaction approval signed by the banknote to server 170 or to payment processing server 200. For example, user computer system 190 is further configured to determine the blockchain address of banknote 100, for example, using sensor 199 and to supplement the payment request to banknote 100 with the blockchain address as the output address of the payment. User computer system 190 may further be configured to directly determine the current nominal value of banknote 100 according to blockchain 148 or by using a server, like server 170 or payment processing server 200, and to display it to a user by using a user interface 191. User interface 191 comprises, for example, an input and output device for communication by the user with mobile communication device 190. The input device comprises, for example, a keyboard and/or a mouse. The output device comprises, for example, a display. For example, the input and output device are combined with one another in the form of a touch display.

Server 200 of the payment service provider is configured, for example, to enable a payment process using banknote 100 and a local device for communicating with banknote 100, for example, mobile communication device 180 or user computer system 190. Payment processing server 200 comprises, for example, a memory 202, a processor 204 for executing program instructions 206, and a communication interface 208 for communicating via network 160. For example, payment processing server 200 provides the local device with transaction data of a transaction to be carried out, for example, a blockchain address to be used as the receiving address and/or information about the amount to be paid. For example, payment processing server 200 forwards signed transaction approvals, received via the local device, to blockchain servers 140, 141. For example, payment processing server 200 forwards transaction confirmations and/or entry confirmations, received from blockchain servers 140, 141, to the local device.

The system comprises, for example, a manufacturer computer system 210, which is used in the context of the production of banknote 100. Manufacturer computer system 210 comprises, for example, a memory 212 and a processor 214 for executing program instructions 216. Manufacturer computer system 210 further comprises, for example, a communication interface 221 for communicating with banknote 100. For example, manufacturer computer system 210 reads public cryptographic key 116 of banknote 100 using communication interface 217. For example, manufacturer computer system 210 sends data for storing on banknote 100, for example, serial number 106 of banknote 100, using communication interface 217. Manufacturer computer system 210 further comprises, for example, a sensor 219 for verifying banknote 100. A quality assurance of banknote 100, for example, is carried out using sensor 219. If banknote 100 passes the quality assurance, a production confirmation is sent, for example, from manufacturer computer system 210 to the central bank, using a communication interface 218 for communicating with a computer system of the central bank, for example, the central bank computer system 220. The production confirmation comprises, for example, serial number 106 and/or public cryptographic key 116 of banknote 100 for initializing banknote 100 in blockchain 148.

The system further comprises, for example, a central bank computer system 220 with a memory 222 and a processor 224 for executing program instructions 226. Central bank computer system 220 further comprises, for example, a communication interface 228 for communicating with manufacturer computer system 210 and/or with blockchain servers 140, 141, for example, via network 160. Central bank computer system 220 is configured, for example, to register and/or block banknotes or blockchain addresses of banknotes in blockchain 148. In other words, central bank computer system 220 is configured, for example, to send an initialization request and/or a blocking request to one of blockchain servers 140, 141 to initialize or block banknote 100. To generate the initialization request, central bank computer system 220 uses data, for example, which the manufacturer computer system provides in the form of the production confirmation. Central bank computer system 220 may further comprise, for example, a sensor for verifying security features of a damaged banknote. In the case that the verification of the security features and the degree of damage of the banknote results that it is a valid banknote, the central bank replaces the damaged banknote. For this purpose, central bank computer system 220 determines, for example, the current nominal value of the damaged banknote using a corresponding request to blockchain servers 141, 141, pays out the current nominal value, and sends a blocking request for blocking the blockchain address of the damaged banknote to one of blockchain servers 141, 141.

FIG. 3 shows a schematic flow diagram of an exemplary method for issuing banknotes 100. In step 300, central bank 220 sends an order to produce banknotes 100 to a manufacturer 210, e.g., a printer. The order specifies, for example, a range of serial numbers. The range of serial numbers specifies serial numbers which are to be used for banknotes 100 to be produced. For example, the order further specifies initial nominal values for banknotes 100 to be produced. For example, the order specifies a minimum nominal value and/or a variable additional nominal value percentage. In step 302, manufacturer 210 produces banknotes 100 according to the received order. Produced banknotes 100 each comprise, for example, a security element with a processor. In step 304, the security elements of banknotes 100 each generate a banknote-specific asymmetric key pair. A public cryptographic key of the asymmetric key pair is respectively stored in a memory of the corresponding security element. The private cryptographic key of the asymmetric key pair is respectively stored in a protected memory area of the memory. In step 306, manufacturer 210 reads each public cryptographic key from the memories of banknotes 100. For example, banknotes 100 each comprise a visual indication of one of the serial numbers from the prespecified range of serial numbers, which were assigned to respective banknote 100 in the context of the manufacturing process. For example, the visual indications of the serial numbers of produced banknotes 100 are read. For example, the serial numbers of banknotes 100 are additionally stored in the memories of banknotes 100. For example, manufacturer 210 additionally reads the serial number from the respective memories of banknotes 100.

In step 308, for example, a visual indication of the read public cryptographic key and/or of a blockchain address of the banknote, derived from the public cryptographic key, is added to the respective banknote, for example, printed on the same. In step 310, a production confirmation, which identifies produced banknotes 100, is sent to central bank 220. For example, the production confirmation specifies the serial numbers of produced banknotes 100. For example, the production confirmation specifies the public cryptographic key and/or the blockchain addresses, derived from the public cryptographic key, of produced banknotes 100. For example, the production confirmation specifies the initial nominal values of produced banknotes 100. For example, the production confirmation specifies minimum nominal values and/or variable additional nominal value percentages of the initial nominal values In step 312, the blockchain addresses of produced banknotes 100 are initialized by central bank 220 in blockchain 148. For example, central bank 220 adds an initialization entry to blockchain 148. For example, the initialization entry specifies the public cryptographic key and/or the blockchain addresses, derived from the public cryptographic key, of produced banknotes 100. For example, the initialization entry further specifies the serial numbers of produced banknotes 100. For example, the initialization entry further specifies the initial nominal values of banknotes 100. For example, the initialization entry further specifies the minimum nominal values values of banknotes 100. In step 314, produced banknotes 100 are delivered and arrive at users 162. For example, the banknotes arrive at users 162 as cash in the context of the cash-based payment transaction.

FIG. 4 shows a schematic flow diagram of an exemplary method for processing payments with a terminal of a PoS (Point of Sale) 164. In step 320, PoS 164 or the terminal receives a public cryptographic key of a blockchain address or a blockchain address, which PoS 164 uses as a payee to receive payments via blockchain 148. In step 322, user 162 provides a banknote 100 for a cashless payment. In step 324, PoS 164 reads a visual indication of a public cryptographic key of banknote 100 or a blockchain address of banknote 100, derived from the public cryptographic key. In step 326, PoS 164 generates a payment request and sends the payment request to banknote 100. For example, the payment request defines a transaction of an amount to be paid from a blockchain address of banknote 100 to the blockchain address of PoS 164 as the payee. Alternatively, PoS 164 might also read the serial number of banknote 100 and send a request to blockchain 148 or a registry 148, which queries the blockchain address corresponding to the serial number. In the case that blockchain 148 or registry 150 comprises an entry, which assigns a blockchain address of banknote 100 to the serial number of banknote 100, PoS 164 receives, as a response to the request, for example, the blockchain address of banknote 100 or a public key of banknote 100, from which the blockchain address may be derived.

In step 328, banknote 100 generates a transaction approval, signs the transaction approval with the private cryptographic key of banknote 100, and sends this to PoS 164. The transaction approval comprises, for example, the blockchain address of banknote 100, the blockchain address of the payee, i.e., PoS 164, and the amount to be paid. The signature further comprises, for example, a timestamp. In step 330, PoS 164 forwards the signed transaction approval to registry 150. Registry 150 is, for example, a registry, updated at regular intervals, which comprises a current nominal value for each of the blockchain addresses of blockchain 148. The current nominal values are calculated from the balance sheets of the transactions, stored in blockchain 148, for the corresponding blockchain addresses. Registry 150 provides, for example, a "fast blockchain", in which the pre-calculated balance sheet results for the blockchain addresses are provided as current nominal values of the corresponding blockchain addresses. Using this type of registry may have the advantage that current nominal values may be determined faster, as these are already available and do not need to be calculated first. Registry 150 may be maintained, for example, by a virtual machine (VM) of blockchain server or blockchain node of the blockchain network. For example, PoS 164 may, however, also send the signed transaction approval to blockchain 148 without using a registry 150.

In step 332, registry 150 or the server/virtual machine on which registry 150 is maintained, verifies the transaction authorized by banknote 100. For example, registry 150 verifies whether the current nominal value of banknote 100 is sufficient to pay the amount to be paid using blockchain 148. For example, registry 150 verifies whether the current nominal value of banknote 100 is greater than or equal to to the amount to be paid. For example, registry 150 verifies wither the current nominal value comprises an additional nominal value percentage, which is sufficient to pay the amount to be paid, i.e., the guaranteed minimum nominal value remains after paying the amount to be paid. Furthermore, registry 150 or the server/virtual machine on which registry 150 is maintained, verifies, for example, the signature of the transaction approval. Furthermore, it is verified, for example, that an identical transaction, e.g., with an identical timestamp to the transaction approval, has not already been entered into the blockchain. In the case that the verification is successful, registry 150 sends a transaction confirmation, which confirms a positive verification of the signed transaction approval to PoS 164. Furthermore, registry 150 or the server/virtual machine on which registry 150 is maintained, forwards the signed transaction approval to blockchain 148 in step 334 for entry. Alternatively or additionally, the server, on which registry 150 is maintained, may enter the transaction, upon a positive verification of the signed transaction approval, and forward the entry to other servers of a blockchain network. In step 336, PoS 164 confirms, upon receipt of the transaction confirmation in step 332, the payment with respect to user 164. For example, the payment confirmation is carried out in step 336, but only with the prerequisite that the amount to be paid is less than a threshold value. In the case that the amount to be paid is greater than or equal to the threshold value, a receipt of an entry confirmation, which confirms the actual entry of the transaction into the blockchain, is additionally necessary to confirm the payment. In step 338, PoS 164 receives an entry confirmation from blockchain 148 or a blockchain server managing blockchain 148, after the entry of the transaction into blockchain 148. In the case that the amount to be paid is greater than or equal to the threshold value, the confirmation of the payment with respect to user 164 is carried out only in step 340.

FIG. 5 shows a schematic flow diagram of an exemplary method for determining a current nominal value of a banknote 100. In step 350, user 162 provides banknote 100 to a reading device, for example, a mobile portable communication device 180, e.g., a smartphone. In step 352, mobile communication device 180 reads a visual indication of a public cryptographic key of banknote 100 or a blockchain address of banknote 100, derived from the public cryptographic key. Alternatively, communication device 180 might also read the serial number of banknote 100. In step 354, communication device 180 sends a request to registry 150 for the current nominal value, which is assigned to the blockchain address of banknote 100. Alternatively, such a request might also be sent to the blockchain or a server managing the blockchain. The request comprises, for example, the public cryptographic key of banknote 100, from which the blockchain address of banknote 100 is derivable, for identifying banknote 100, whose current nominal value is to be determined. For example, the request for identifying banknote 100 comprises the blockchain address of banknote 100. For example, the request comprises the serial number of banknote 100, in the case that blockchain 148 or registry 150 comprises an entry which assigns a blockchain address of banknote 100 to the serial number of banknote 100. In step 356, registry 150 or blockchain 148 or a server managing registry 150 or blockchain 148 sends the current nominal value to mobile communication device 180 in response to the request. In step 358, mobile communication device 180 displays the current nominal value of banknote 100 to user 162.

FIGS. 6A and 6B show a schematic flow diagram of an exemplary method for processing payments with a mobile portable communication device 180. Mobile portable communication device 180 is, for example, a smartphone. For example, processing a payment with mobile portable communication device 180 is carried out using a server 170. Mobile portable communication device 180 functions, for example, as a PoS for a purchase via the internet using server 170. In step 360, server 170 receives a public cryptographic key of a blockchain address or a blockchain address, which server 170 uses as a payee to receive payments via blockchain 148. In step 362, server 170 sends a payment request to mobile communication device 180 to settle a payment. For example, server 170 is a service server and the payment is a payment for a service provided by the service server and used by user 162. For example, server 170 is a server of a financial service provider, which settles a payment for user 162. The payment request comprises, for example, an indication of the public cryptographic key or the blockchain address of server 170 as a payee and an indication of the amount to be paid. In step 364, user 162 provides a banknote 100 for a cashless payment. In step 366, mobile communication device 180 reads a visual indication of a public cryptographic key of banknote 100 or a blockchain address of banknote 100, derived from the public cryptographic key. In step 368, mobile communication device 180 supplements the payment request received in step 362 and sends the supplemented payment request to banknote 100. For example, mobile communication device 180 supplements the payment request with the blockchain address of banknote 100. Alternatively, mobile communication device 180 might also read the serial number of banknote 100 and send a request to blockchain 148 or a registry 150, which queries the blockchain address assigned to the corresponding serial number. In the case that blockchain 148 or registry 150 comprises an entry, which assigns a blockchain address of banknote 100 to the serial number of banknote 100, mobile communication device 180 receives, as an answer to the request, for example, the blockchain address of banknote 100 or a public key of banknote 100, from which the blockchain address may be derived.

In step 370, banknote 100 generates a transaction approval, signs the transaction approval with the private cryptographic key of banknote 100, and sends this to mobile communication device 180. The transaction approval comprises, for example, the blockchain address of banknote 100, the blockchain address of the payee, i.e., server 170, and the amount to be paid. The signature further comprises, for example, a timestamp. In step 372, mobile communication device 180 forwards the signed transaction approval to server 170, which forwards the signed transaction approval to registry 150 in step 374. Registry 150 is, for example, a registry, updated at regular intervals, which comprises a current nominal value for each of the blockchain addresses of blockchain 148. The current nominal values are calculated from the balance sheets of the transactions, stored in blockchain 148, for the corresponding blockchain addresses. Registry 150 provides, for example, a "fast blockchain", in which the pre-calculated balance sheet results for the blockchain addresses are provided as current nominal values of the corresponding blockchain addresses. For example, server 170 may, however, also send the signed transaction approval to blockchain 148 without using a registry 150. In step 376, registry 150 or the server/virtual machine on which registry 150 is maintained, verifies the transaction authorized by banknote 100. For example, registry 150 verifies whether the current nominal value of banknote 100 is sufficient to pay the amount to be paid using blockchain 148.

For example, registry 150 verifies whether the current nominal value of banknote 100 is greater than or equal to the amount to be paid. For example, registry 150 verifies whether the current nominal value comprises an additional nominal value percentage, which is sufficient to pay the amount to be paid, i.e., the guaranteed minimum nominal value remains after paying the amount to be paid. Furthermore, registry 150 or the server/virtual machine on which registry 150 is maintained, verifies, for example, the signature of the transaction approval. Furthermore, it is verified, for example, that an identical transaction, e.g., with an identical timestamp to the transaction approval, has not already been entered into the blockchain. In the case that the verification is successful, registry 150 sends a transaction confirmation, which confirms a positive verification of the signed transaction approval, to server 170. Furthermore, registry 150 or the server/virtual machine on which registry 150 is maintained, forwards the signed transaction approval to blockchain 148 in step 378 for entry. Alternatively or additionally, the server, on which registry 150 is maintained, may enter the transaction, upon a positive verification of the signed transaction approval, and forward the entry to other servers of a blockchain network. In step 380, server 170 forwards the transaction confirmation to mobile communication device 180. In step 382, mobile communication device 180 confirms the payment with respect to user 164. For example, the payment confirmation is carried out in step 382, but only with the prerequisite that the amount to be paid is less than a threshold value. In the case that the amount to be paid is greater than or equal to the threshold value, a receipt of an entry confirmation, which confirms the actual entry of the transaction into the blockchain, is additionally necessary to confirm the payment. In step 384, server 170 receives an entry confirmation from blockchain 148 or from a blockchain server maintaining blockchain 148, after the entry of the transaction into blockchain 148. In step 386, server 170 forwards the entry confirmation to mobile communication device 180. In the case that the amount to be paid is greater than or equal to the threshold value, the confirmation of the payment with respect to user 164 is carried out only in step 338.

FIG. 7 shows a schematic flow diagram of an exemplary method for replacing a banknote 100. In step 390, user 162 provides a damaged banknote 100 to central bank 220. In step 392, central bank 220 verifies the security features of damaged banknote 100, in order to determine whether damaged banknote 100 is a valid banknote 100, which has been damaged. Central bank 220 further verifies, for example, whether more than 50% of present banknote 100 is undamaged. In the case that the verification by central bank 220 results that the damaged banknote is a valid banknote, in step 394, central bank 220 reads a visual indication of a public cryptographic key of banknote 100 or a blockchain address of banknote 100, derived from the public cryptographic key. Alternatively, central bank 220 might also read the serial number of banknote 100. In step 396, central bank 220 sends a request to registry 150 for the current nominal value, which is assigned to the blockchain address of banknote 100. Alternatively, such a request might also be sent to the blockchain or a server managing the blockchain. The request comprises, for example, the public cryptographic key of banknote 100, from which the blockchain address of banknote 100 is derivable, for identifying banknote 100, whose current nominal value is to be determined. For example, the request for identifying banknote 100 comprises the blockchain address of banknote 100. For example, the request comprises the serial number of banknote 100, in the case that blockchain 148 or registry 150 comprises an entry, which assigns a blockchain address of banknote 100 to the serial number of banknote 100. In step

398, registry 150 or blockchain 148 or a server maintaining registry 150 or blockchain 148 sends the current nominal value to central bank 220 in response to the request.

In step 400, central bank 330 pays out the current nominal value of damaged banknote 100. For example, the payment of the current nominal value of damaged banknote 100 comprises providing one or more banknotes as a replacement for damaged banknote 100, whose current nominal values in sum correspond to the current nominal value of damaged banknote 100. For example, the one or more banknotes as a replacement for damaged banknote 100 is/are banknotes according to one of the previously described embodiments. For example, the payment of the current nominal value of damaged banknote 100 comprises an entry of a transaction of an amount at the level of the current nominal value from a blockchain address of central bank 220 issuing the damaged banknote to a blockchain address specified by an owner of damaged banknote 100. For example, the specified blockchain address is assigned to another banknote of the owner, i.e., the possessor, of damaged banknotes 100, the owner of the damaged banknote personally, or to another institution selected by the owner of the damaged banknotes. In step 402, central bank 220 sends a blocking entry to blockchain 148. By entering the blocking entry into blockchain 148, the blockchain address of damaged banknote 100 is blocked. As a consequence of the blocking, it is, for example, not possible to execute a transaction with the blockchain address of damaged banknote 100 as the output address, nor to execute a transaction with the blockchain address of damaged banknote 100 as the target address, i.e., to enter into blockchain 148. For example, it is verified as a prerequisite for entering a transaction into blockchain 148, whether a blocking entry is present for the output address or the target address of the transaction. In the case that the output address or target address of the transaction is blocked, the entry is denied, for example. Otherwise, the entry is carried out, for example.

FIG. 8 shows a schematic flow diagram of an exemplary method for using a banknote. The banknote comprises, for example, a security element with a processor and a memory. A banknote-specific private cryptographic key of an asymmetric key pair of the banknote is stored in a protected memory area of the memory. The asymmetric key pair is assigned to a banknote-specific blockchain address of a blockchain, which a central bank that issues the banknote manages. The processor is thereby configured to execute a payment method with the banknote using the program instructions.

In block 500, the banknote receives a payment request for a payment in the form of a transaction of an amount to be paid from the blockchain address of the banknote to a blockchain address of a payee. The payment request specifies the amount to be paid and the blockchain address of the payee. In block 502, a transaction approval is signed with the private cryptographic key of the banknote. The transaction approval comprises the blockchain address of the banknote, the blockchain address of the payee, and the amount to be paid. The signature further comprises a timestamp. In block 504, the signed transaction approval is sent.

FIG. 9 shows a schematic flow diagram of an exemplary method for issuing a banknote. In block 501, the banknote is produced. The banknote comprises a visual indication of a serial number of the banknote, uniquely identifying the banknote, from a predefined range of serial numbers and an initial nominal value of the banknote. The banknote further comprises a security element with a processor and a memory. In block 512, the banknote generates a banknote-specific asymmetric key pair with a private and a public cryptographic key. In block 514, the banknote stores the generated banknote-specific asymmetric key pair in the memory. The private cryptographic key is thereby stored in a protected memory area of the memory. In block 516, the banknote outputs the generated public cryptographic key to initialize a banknote-specific blockchain address derived from the public cryptographic key by a central bank issuing the banknote in a blockchain. In the context of the initialization, the initial nominal value is assigned to the blockchain address of the banknote.

FIG. 10 shows a schematic flow diagram of an exemplary method for processing a payment with a terminal. The payment is carried out with a banknote, which comprises, for example, a visual indication of an identifier, uniquely identifying a blockchain address of the banknote. The banknote comprises a communication interface for communicating with the terminal and a security element with a processor and a memory. A banknote-specific private cryptographic key of an asymmetric key pair of the banknote is stored in a protected memory area of the memory. The asymmetric key pair is assigned to a banknote-specific blockchain address, which a central bank issuing the banknote manages. For example, the identifier of the blockchain address of the banknote is additionally stored in the memory. The identifier is, for example, the serial number of the banknote, the public cryptographic key of the banknote, or the blockchain address of the banknote itself. The terminal comprises a processor, a memory, and a communication interface for communicating with the banknote.

In block 520, the terminal detects the identifier of the blockchain address of the banknote, which uniquely identifies the blockchain address of the banknote. The detected identifier is, for example, the serial number of the banknote, the public cryptographic key of the banknote, or the blockchain address of the banknote itself. The detection may comprise an optical detection of a visual indication of the identifier with an optical sensor and/or a reading of the identifier stored in the memory via the communication interface of the banknote. In block 522, the terminal sends a blockchain query for the current nominal value of the blockchain address of the banknote, which is identified by the detected identifier. In block 524, the terminal receives the current nominal value of the blockchain address of the banknote. In block 526, the terminal verifies whether the received current nominal value is greater than or equal to the amount to be paid. In the case that the current nominal value is not greater than or equal to the amount to be paid, i.e., the verification is unsuccessful, the method continues with block 528. In block 528, the method is terminated. In the case that the current nominal value is greater than or equal to the amount to be paid, i.e., the verification is successful, the method continues with block 530. In block 530, the terminal sends a payment request to the banknote in the form of a transaction of an amount to be paid from the blockchain address of the banknote to a blockchain address of a payee. The payment request specifies the amount to be paid and the blockchain address of the payee. In block 532, the terminal receives a signed transaction approval from the banknote. The transaction approval is signed with a private cryptographic key of the banknote. The transaction approval comprises the blockchain address of the banknote, the blockchain address of the payee, and the amount to be paid. The signature further comprises, for example, a timestamp. In block 534, the terminal forwards the signed transaction approval of the banknote to a blockchain server of the blockchain to verify and enter the transaction into the blockchain. In block 536, upon a successful verification of the signed transaction approval, the terminal receives a transaction confirmation.

FIG. 11 shows a schematic flow diagram of an exemplary method for processing a payment with a plurality of banknotes. In block 540, a plurality of banknotes is received. In block 542, the identifiers of the blockchain addresses of the received banknotes are detected, i.e., for example, the serial numbers, public cryptographic keys, and/or blockchain addresses of the corresponding banknotes. In block 544, a current nominal value, which is stored under the corresponding blockchain address, is determined for each of the detected identifiers. For this purpose, a blockchain query for the corresponding nominal value is used. In block 546, a set of banknotes is selected from the plurality of received banknotes and retained, whose summed current nominal value yields an amount which is less than an amount to be paid. A remaining difference amount amount between the amount to be paid and the summed amount of the set of selected banknotes is less than a current nominal value of an additional banknote from the plurality of banknotes, which is not included in the set of selected banknotes. In block 548, a payment request for paying the difference amount is set to the additional banknote.

FIG. 12 shows a schematic flow diagram of an exemplary method for determining a current nominal value. The banknote comprises a visual indication of an identifier, uniquely identifying the blockchain address of the banknote. The banknote comprises a communication interface for communicating with the terminal and a security element with a processor and a memory. A banknote-specific private cryptographic key of an asymmetric key pair of the banknote is stored in a protected memory area of the memory. The asymmetric key pair is assigned to a banknote-specific blockchain address of a blockchain, which is managed by a central bank issuing the banknote. The identifier is, for example, the serial number, the public cryptographic key, or the blockchain address of the banknote.

The terminal comprises a processor, a memory, and a communication interface for communicating with the banknote. In block 550, the terminal detects an identifier of the blockchain address of the banknote, which uniquely identifies the blockchain address of the banknote. The detected identifier is, for example, the serial number of the banknote, the public cryptographic key of the banknote, or the blockchain address of the banknote itself. In block 552, the terminal generates and sends a blockchain query for the current nominal value of the blockchain address of the banknote, which is identified by the detected identifier. In block 554, the terminal receives the current nominal value of the blockchain address of the banknote.

FIG. 13 shows a schematic flow diagram of an exemplary method for replacing a banknote. The banknote comprises, for example, a visual indication of an identifier of a blockchain address of the banknote. The banknote comprises the visual indication of the identifier distributed, for example, multiple times across the banknote. The banknote further comprises a plurality of security features arranged distributed across the banknote. The banknote comprises a security element with a processor and a memory with program instructions. A banknote-specific private cryptographic key of an asymmetric key pair of the banknote is stored in a protected memory area of the memory. The asymmetric key pair is assigned to a banknote-specific blockchain address in a blockchain, which is managed by a central bank issuing the banknote.

The banknote has damage. In block 560, a degree of damage of the banknote is determined. In block 562, it is verified whether the degree of damage of the banknote exceeds a predefined allowable maximum degree of damage. In the case that the degree of damage of the banknote exceeds a predefined allowable maximum degree of damage, the method is terminated in block 564. In the case that the degree of damage of the banknote does not exceed a predefined allowable maximum degree of damage, the method is continued in block 566 with a detection of the identifier of the blockchain address of the damaged banknote, which uniquely identifies the blockchain address of the damaged banknote. The detected identifier is, for example, the serial number of the damaged banknote, the public cryptographic key of the damaged banknote, or the blockchain address of the damaged banknote itself. In block 568, a blocking of the blockchain address of the damaged banknote is initiated using the detected identifier. In block 570, a blockchain query for the current nominal value of the blockchain address of the damaged banknote is sent. In block 572, the current nominal value of the corresponding blockchain address is received, and paid out in block 574. Step 568 may thereby be carried out before step 570 or after step 572.

LIST OF REFERENCE NUMERALS

100 Banknote
102 Security element
104 Communication interface
106 Serial number
107 Visual indication
108 Nominal value
110 Security feature
112 User interface
116 Public key
118 Private key
120 Memory
122 Protected memory area
124 Processor
128 Program instructions
130 Terminal
132 Memory
134 Processor
136 Program instructions
137 Communication interface
138 Communication interface
139 Sensor
140 Blockchain server
141 Blockchain server
142 Processor
143 Program instructions
144 Program instructions
146 Memory
147 Memory
148 Blockchain
150 Registry
152 Communication interface
153 Communication interface
154 Blockchain network
156 Central bank system
160 Network
162 User
164 PoS
170 Server
172 Memory
174 Processor 176 Program instructions
178 Communication interface
180 Mobile portable communication device
181 User interface
182 Memory
184 Processor
186 Program instructions
187 Communication interface
188 Communication interface
189 Camera
190 User computer system
191 User interface
192 Memory
194 Processor
196 Program instructions
197 Communication interface
198 Communication interface
199 Sensor
200 Payment processing server
202 Memory
204 Processor
206 Program instructions
208 Communication interface
210 Manufacturer computer system
212 Memory
214 Processor
216 Program instructions
217 Communication interface
218 Communication interface
219 Sensor
220 Central computer system
222 Memory
224 Processor
226 Program instructions
228 Communication interface
229 Sensor

The invention claimed is:

1. A banknote comprising a security element including sensors, a processor and a memory with program instructions,
   wherein a banknote-specific private cryptographic key of an asymmetric key pair of the banknote is stored in a protected memory area of the memory, wherein the asymmetric key pair is assigned to a banknote-specific blockchain address in a blockchain managed by a central bank issuing the banknote,
   wherein the processor is configured to execute a payment method with the banknote when executing the program instructions, wherein the payment method comprises:
   monitoring, by the sensors, the security element against unauthorized electrical and physical manipulation;
   receiving a payment request for a payment with the banknote in the form of a transaction of an amount to be paid from the blockchain address of the banknote to a blockchain address of a payee, wherein the payment request specifies the amount to be paid and the blockchain address of the payee;
   signing a transaction approval with the private cryptographic key of the banknote, wherein the transaction approval comprises the blockchain address of the banknote, the blockchain address of the payee, and the amount to be paid; and
   sending the signed transaction approval.

2. The banknote according to claim 1, wherein a further transaction-specific value is sent together with the signed transaction approval.

3. The banknote according to claim 1, wherein the banknote comprises a visual indication of an initial nominal value assigned to the banknote.

4. The banknote according to claim 1, wherein the banknote comprises a visual indication of a serial number uniquely identifying the banknote.

5. The banknote according to claim 4, wherein the banknote comprises the visual indication of the serial number distributed multiple times across the banknote.

6. The banknote according to claim 1, wherein a banknote- specific public cryptographic key of the asymmetric key pair of the banknote, from which the blockchain address of the banknote is derivable, is further stored in the memory.

7. The banknote according to claim 1, wherein the banknote further comprises a visual indication of the banknote-specific public cryptographic key and/or the blockchain address of the banknote.

8. The banknote according to claim 1, wherein the banknote comprises a plurality of security features, wherein one or more security features of the plurality of security features comprise(s) an indication of the serial number, the banknote-specific public cryptographic key, and/or the blockchain address of the banknote.

9. The banknote according to claim 1, wherein the banknote generates the transaction approval using the information of the payment request.

10. The banknote according to claim 1, wherein the payment request comprises the complete transaction information which the banknote signs as the transaction approval.

11. The banknote according to claim 1, wherein the banknote comprises a communication interface for communication with a terminal, wherein the banknote receives the payment request from the terminal via the communication interface and/or sends the signed transaction approval to the terminal via the communication interface.

12. A method for using a banknote, wherein the banknote comprises a security element including sensors, a processor and a memory with program instructions,
   wherein a banknote-specific private cryptographic key of an asymmetric key pair of the banknote is stored in a protected memory area of the memory, wherein the asymmetric key pair is assigned to a banknote-specific blockchain address of a blockchain managed by a central bank issuing the banknote,
   wherein the processor is configured to execute a payment method with the banknote when executing the program instructions, wherein the payment method comprises:
   monitoring, by sensors, the security element against unauthorized electrical and physical manipulation;
   receiving a payment request for a payment with the banknote in the form of a transaction of an amount to be paid from the blockchain address of the banknote to a blockchain address of a payee, wherein the payment request specifies the amount to be paid and the blockchain address of the payee;
   signing a transaction approval with the private cryptographic key of the banknote, wherein the transaction approval comprises the blockchain address of the banknote, the blockchain address of the payee, and the amount to be paid; and
   sending the signed transaction approval.

13. A method for using a banknote according to claim 12, wherein another transaction-specific value is further sent, together with the signed transaction approval.

14. The method for using a banknote according to claim 12, wherein a banknote-specific public cryptographic key of the asymmetric key pair of the banknote, from which the blockchain address of the banknote is derivable, is further stored in the memory.

15. The method for using a banknote according to claim 12, wherein the banknote comprises a visual indication of the banknote-specific public cryptographic key.

16. The method for using a banknote according to claim 12, wherein the banknote generates the transaction approval using the information of the payment request.

17. The method for using a banknote according to claim 12, wherein the payment request comprises the complete transaction information which the banknote signs as the transaction approval.

18. The method for using a banknote according to claim 12, wherein the banknote comprises a communication interface for communication with a terminal, wherein the banknote receives the payment request from the terminal via the communication interface and/or sends the signed transaction approval to the terminal via the communication interface.

* * * * *